(12) United States Patent
Stein

(10) Patent No.: US 12,154,440 B2
(45) Date of Patent: Nov. 26, 2024

(54) UNMANNED AERIAL VEHICLE WITH IMMUNITY TO HIJACKING, JAMMING, AND SPOOFING ATTACKS

(71) Applicant: Eyal Stein, Sharon, MA (US)

(72) Inventor: Eyal Stein, Sharon, MA (US)

(73) Assignee: DROBOTICS, LLC, Saint Petersburg, FL (US)

( * ) Notice: Subject to any disclaimer, the term of this patent is extended or adjusted under 35 U.S.C. 154(b) by 634 days.

(21) Appl. No.: 17/443,573

(22) Filed: Jul. 27, 2021

(65) Prior Publication Data

US 2024/0118710 A1    Apr. 11, 2024

Related U.S. Application Data

(60) Provisional application No. 63/068,660, filed on Aug. 21, 2020.

(51) Int. Cl.
*G08G 5/00*    (2006.01)
*B64C 39/02*    (2023.01)
(Continued)

(52) U.S. Cl.
CPC ......... *G08G 5/0039* (2013.01); *B64C 39/024* (2013.01); *B64D 47/08* (2013.01); *G05B 13/027* (2013.01); *G05D 1/101* (2013.01); *G05D 1/2437* (2024.01); *G05D 1/245* (2024.01); *G05D 1/248* (2024.01); *G05D 1/46* (2024.01); *G05D 1/619* (2024.01); *G08G 5/0004* (2013.01); *G08G 5/04* (2013.01); *B64U 10/13* (2023.01); *B64U 2101/00* (2023.01); *B64U 2101/15* (2023.01);
(Continued)

(58) Field of Classification Search
CPC ............ B64U 2101/10; B64U 2101/15; B64U 2101/30; G05D 1/619; G05D 1/2437; G05D 1/245; G05D 1/248; G05D 2101/15; G05D 2109/254
See application file for complete search history.

(56) References Cited

U.S. PATENT DOCUMENTS 9,524,648 B1    12/2016    Gopalakrishnan et al.
9,725,171 B1    8/2017    Carmack et al.
(Continued)

FOREIGN PATENT DOCUMENTS

CN    107065929 A    *    8/2017
WO    2019135368 A1        7/2019

OTHER PUBLICATIONS

Machine translation of CN-107065929-A (Year: 2017).*
(Continued)

*Primary Examiner* — Navid Z. Mehdizadeh
*Assistant Examiner* — Caitlin R McCleary
(74) *Attorney, Agent, or Firm* — Morgan, Lewis & Bockius LLP

(57) ABSTRACT

An unmanned aerial vehicle (UAV) or "drone" executes a neural network to assist with detecting and responding to attacks. The neural network may monitor, in real time, the data stream from a plurality of onboard sensors during navigation and may communicate with a high-altitude pseudosatellite ("HAPS") platform. For example, if the neural network detects a cyber-attack but determines that it does not interfere with external communications, it may shift navigation control of the drone to the HAPS.

26 Claims, 22 Drawing Sheets

(51) Int. Cl.

| | |
|---|---|
| *B64D 47/08* | (2006.01) |
| *B64U 10/13* | (2023.01) |
| *B64U 101/00* | (2023.01) |
| *B64U 101/15* | (2023.01) |
| *B64U 101/20* | (2023.01) |
| *B64U 101/30* | (2023.01) |
| *G05B 13/02* | (2006.01) |
| *G05D 1/00* | (2024.01) |
| *G05D 1/243* | (2024.01) |
| *G05D 1/245* | (2024.01) |
| *G05D 1/248* | (2024.01) |
| *G05D 1/46* | (2024.01) |
| *G05D 1/617* | (2024.01) |
| *G05D 101/15* | (2024.01) |
| *G05D 109/25* | (2024.01) |
| *G08G 5/04* | (2006.01) |

(52) U.S. Cl.
CPC ...... *B64U 2101/20* (2023.01); *B64U 2101/30* (2023.01); *B64U 2201/10* (2023.01); *B64U 2201/20* (2023.01); *G05D 2101/15* (2024.01); *G05D 2109/254* (2024.01)

(56) References Cited

U.S. PATENT DOCUMENTS

| | | | |
|---|---|---|---|
| 2011/0163897 A1* | 7/2011 | Russo | F41H 11/02 340/945 |
| 2014/0327581 A1* | 11/2014 | Murphy | G01S 3/043 342/417 |
| 2018/0041267 A1* | 2/2018 | Miranda | H04B 7/1851 |
| 2018/0054251 A1 | 2/2018 | Alex | |
| 2018/0343054 A1 | 11/2018 | Barritt | |
| 2019/0019417 A1 | 1/2019 | Zelenka | |
| 2019/0191311 A1 | 6/2019 | O'Brien et al. | |
| 2019/0260768 A1* | 8/2019 | Mestha | H04L 63/1416 |
| 2020/0037166 A1 | 1/2020 | Shattil et al. | |
| 2020/0324898 A1* | 10/2020 | Youmans | G06V 10/44 |
| 2021/0065564 A1* | 3/2021 | Vacek | G08G 5/0082 |
| 2021/0184758 A1* | 6/2021 | Barritt | G08G 1/20 |
| 2022/0182132 A1* | 6/2022 | Hirai | H04B 17/345 |

OTHER PUBLICATIONS

International Search Report and Written Opinion for International Patent Application No. PCT/US21/70966 mailed on Nov. 8, 2021, 11 pages.

International Search Report and Written Opinion for International Patent Application No. PCT/US2021/070965 dated May 10, 2022, 8 pages.

* cited by examiner

UNMANNED AERIAL VEHICLE WITH IMMUNITY TO HIJACKING, JAMMING, AND SPOOFING ATTACKS

CROSS-REFERENCE TO RELATED APPLICATION

This application claims priority to and the benefit of, and incorporates herein by reference in its entirety, U.S. Ser. No. 63/068,660, filed on Aug. 21, 2020.

FIELD OF THE INVENTION

The present invention relates, generally, to navigation of, and mission execution by, unmanned aerial vehicles (UAVs), and in particular to UAVs with resistance to electronic attacks that attempt to hijack or otherwise affect airborne operation.

BACKGROUND

A UAV, commonly known as a drone or unmanned aerial system (UAS), and also referred to as a remotely piloted aircraft, is a flight vehicle without a human pilot aboard. Its path is controlled either autonomously by onboard computers or by the remote control of a pilot on the ground or in another vehicle. Drones have proliferated in number as recognition of their widespread and diverse commercial potential has increased.

Drones may make use of global positioning system (GPS) navigation functions, e.g., using GPS waypoints for navigation, and tend to follow preprogrammed flight paths. These may lead the drone to or around assets it will scan and inspect using onboard sensors. Drone systems may utilize a variety of onboard sensors (including one or more cameras, radiofrequency (RF) sensors, etc.) to monitor the operating environment, pre-calculate and follow a path to an asset to be inspected, and perform the inspection.

Despite the presence of these sensors, the drone may not be equipped to use the data they provide to react to unplanned changes in flight path (e.g., to avoid unexpected obstacles or perform collision-avoidance maneuvers), or adapt to GPS drift that can affect waypoint accuracy. GPS drifts occur when a preprogrammed flight path fails to account for GPS drift vector calibrations and corrections. When the operator defines a flight plan with waypoints in the absence of such corrections, for example, the navigation system may take the drone off-course; even a small deviation may take all or part of the asset of interest outside the preprogrammed flight path and, consequently, the field of view of the onboard sensors. More dangerous than GPS drift are electronic "spoofing" attacks that may mimic GPS signals and hijack a drone, guiding it away from its intended flight path to damage or steal the drone or cause collateral damage to persons or property. Other forms of cyber-attack that may be used against drones include RF saturation attacks, which are designed to sever the connection between a drone and satellite or terrestrial communications. As electronic attacks and their targets proliferate, the need to secure drones against malicious attempts to commandeer or interfere with a drone's operation is an urgent one.

SUMMARY

Embodiments of the present invention detect and defeat attempts to hijack, alter or otherwise interfere with drone navigation and control. These efforts, broadly referred to herein as "attacks," may take numerous forms. If the drone's navigation package is compromised, it may not be possible to restore proper operation during flight; indeed, the intrusion may itself be very difficult to detect. If the connection between a drone and satellite or terrestrial control entities is severed or hijacked, it will be impossible to transfer navigation control to such entities in order to avoid the consequences of the attack. Laser attacks that are designed to disorient or blind on-board optical sensors can send the drone off-course even if the navigation package itself is unaffected.

In various embodiments, the drone includes a neural network that analyzes image frames captured in real time by an onboard camera as the drone travels. Neural networks are computer algorithms modeled loosely after the human brain and excel at recognizing patterns, learning nonlinear rules, and defining complex relationships among data. They can help drones navigate and provide mission support to ensure proper asset inspection without data overcollection. A drone in accordance herewith may execute a neural network to assist with inspection, surveillance, reporting, and other missions. The invention may make use of unsupervised "deep learning" neural networks executed onboard low-altitude inspection drones. Such a drone inspection neural network ("DINN") may monitor, in real time, the data stream from a plurality of onboard sensors during navigation to an asset along a preprogrammed flight path and/or during its mission (e.g., as it scans and inspects an asset). This neural network may communicate with unmanned traffic-management systems, as well as with manned air traffic, to allow for safe and efficient drone operation within an airspace. Using a bidirectional connection to terrestrial and/or satellite-based communication networks, the DINN may request or receive real-time airspace change authorizations so it can adapt the drone flight path to account for airspace conflicts with other air traffic, terrain or obstacle conflicts, or to optimize the drone's flight path for more efficient mission execution. Importantly, the DINN can enable the drone to act as an independent layer of oversight and defense to monitor position drone data, detect attacks, and determine appropriate action. In the event of GPS spoofing attacks designed to hijack a drone and guide it away from its intended flight path, or RF-blocking attacks designed to sever the connection between a drone and a HAPSNN or terrestrial communications, the DINN can track the position of the drone relative to an asset or other landmarks and enable the drone to resist being navigated in other directions, or maintain a safe flight path until communications are reliably re-established. In the event of laser attacks intended to disorient or blind optical sensors, the DINN can recognize and classify the patterns produced by such attacks and trigger preprogrammed responses by the drone to counter the attack or alter the flight path of the drone to distance itself from the source of the attack.

Airborne infrastructure can include high-altitude pseudosatellite ("HAPS") platforms, also called a high-altitude, long-duration ("HALE") platforms. These are unmanned aerial vehicles that operate persistently at high altitudes (of, e.g., at least 70,000 feet) and can be recharged by solar radiation during the day so they can remain in flight for prolonged periods of time to provide broad, satellite-like coverage of airspace. A HAPS drone equipped with RF communications payloads can offer vast areas of RF coverage—alone or in concert with existing communication satellite constellations or ground-based telecommunications networks, national airspace surveillance infrastructures, national airspace navigational aids, or individual air-traffic communication and surveillance systems—to offer connectivity and real-time communications and surveillance services to air traffic including drones.

HAPS platforms can be operated with less expense and greater flexibility than satellite constellations, which are not easily recalled for upgrades to meet changing bandwidth demands or augmented in number on short notice. In addition, satellites do not readily integrate with existing terrestrial air-traffic surveillance systems, making them less well suited than HAPS platforms for monitoring drone operation and maintaining the safe separation of drones and manned air traffic operating in the same airspace. Terrestrial alternatives such as telecommunication sites generally have short range and small areas of coverage, and once again, expanding coverage or capabilities is expensive and may not even be feasible due to features of the terrain or manmade structures.

A HAPS platform may execute a neural network (a "HAPSNN") as it monitors air traffic; the neural network enables it to classify, predict, and resolve events in its airspace of coverage in real time as well as learn from new events that have never before been seen or detected. The HAPSNN-equipped HAPS platform may provide surveillance of nearly 100% of air traffic in its airspace of coverage, and the HAPSNN may process data received from a drone to facilitate safe and efficient drone operation within an airspace. The HAPSNN also enables bidirectional connection and real-time monitoring so drones can better execute their intended missions.

In various embodiments, the DINN cooperates with a HAPSNN. For example, if the DINN detects an attack but determines that it does not interfere with external communications, the DINN may shift navigation control of the drone to the HAPSNN.

Accordingly, in a first aspect, the invention pertains to a UAV comprising, in various embodiments, a neural compute engine; a flight package; a navigation system; an image-acquisition device; a communication facility including a plurality of agile transceivers; a computer memory including a plurality of pre-stored waypoints and flight images; and a computer including a processor and instructions, stored in the computer memory and executable by the processor, for using data received from one or more of the image-acquisition device, the communications array or the navigation system as input to a predictor that has been trained to (a) detect an attack on the UAV, (b) identify a mitigation action to be taken in response, and (c) cause the action to be taken.

If the attack is GPS spoofing, the action may be causing the drone to navigate without GPS and tuning the agile transceivers to a plurality of national airspace navigational aids along a prestored waypoint flight plan. The drone may navigate without GPS navigation using optical flow and/or intertial navigation with Kalman filtering. If the attack is GPS spoofing, the action may be causing transfer of navigation control to a HAPS. If the attack is RF blocking and the action is execution of a preprogrammed flight plan that does not require external communication. In some embodiments, the preprogrammed flight plan relies on (i) at least one of inertial navigation with Kalman filtering or optical flow to navigate the drone along the preprogrammed waypoint flight plan and (ii) classifying when the drone reached each waypoint using image matching. If the attack is a laser attack, the action may be to plot and cause the drone to follow a flight path away from the laser.

In some embodiments, the computer is further configured to communicate with a HAPS vehicle in order to computationally identify the mitigation action. The predictor may be, for example, a neural network. In various embodiments, the communication facility is configured to interact with terrestrial and airborne control systems. The UAV may further comprise a database of predefined actions, where the computer is configured to select and cause execution of an action from the database in response to the detected attack.

In another aspect, the invention relates to a method of operating a UAV. In various embodiments, the method comprises the steps of acquiring digital images in real time during a flight of the UAV; acquiring GPS signals for navigating the UAV; communicating via wireless signals with terrestrial or airborne infrastructure; computationally analyzing the acquired digital images, the GPS signals and/or the wireless communication signals with a predictor that has been computationally trained to detect, based thereon, a cyber-attack on the UAV; computationally identifying a mitigation action to be taken in response to the detected cyber-attack; and causing the action to be taken.

BRIEF DESCRIPTION OF THE DRAWINGS

The foregoing and the following detailed description will be more readily understood when taken in conjunction with the drawings, in which.

DETAILED DESCRIPTION

Figure 1:
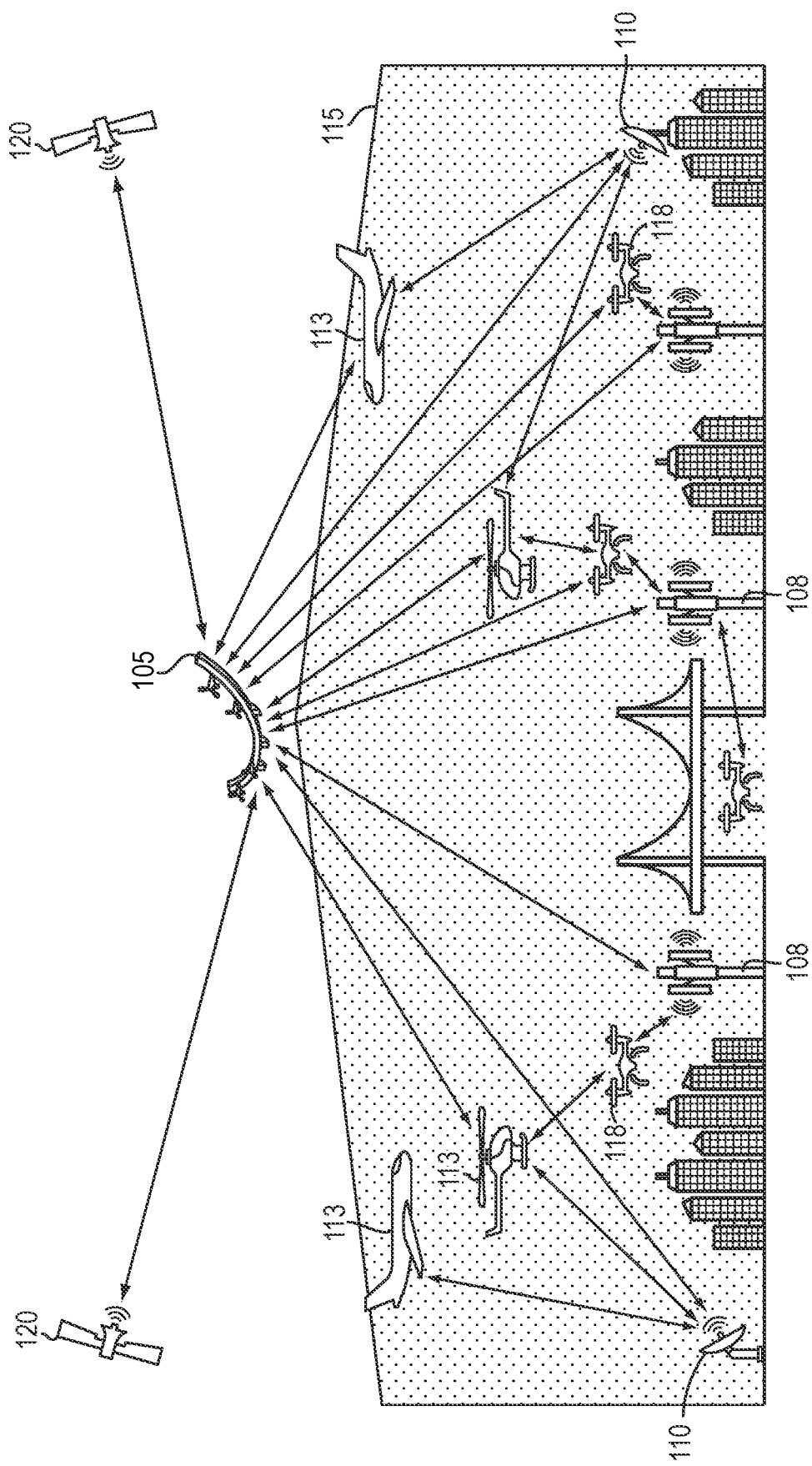
FIG. 1 conceptually illustrates a HAPS providing surveillance and connectivity in a monitored airspace.

Refer first to FIGS. 1-7, which illustrate the functions performed by a conventional HAPS platform 105 and the manner in which these functions may be enhanced through operation of a HAPSNN. In FIG. 1, the HAPS platform 105 communicates with a plurality of cell towers representatively indicated at 108, a plurality of aviation control systems representatively indicated at 110, and a series of aircraft representatively indicated at 113; all of these systems and vehicles are within the defined airspace 115 that the HAPS platform 105 monitors. The HAPS platform 105 may also communicate with a plurality of drones 118 in the airspace 115, directly and/or via a cell tower. Finally, the HAPS platform 105 may communicate with satellites representatively indicated at 120, e.g., for geolocation to maintain a substantially fixed position. In this way, the HAPS platform 105 obtains and updates a complete snapshot of the airspace 115 and monitors air traffic therein, serving as a communication hub among the various intercommunicating entities in the airspace 115.

Figure 2:
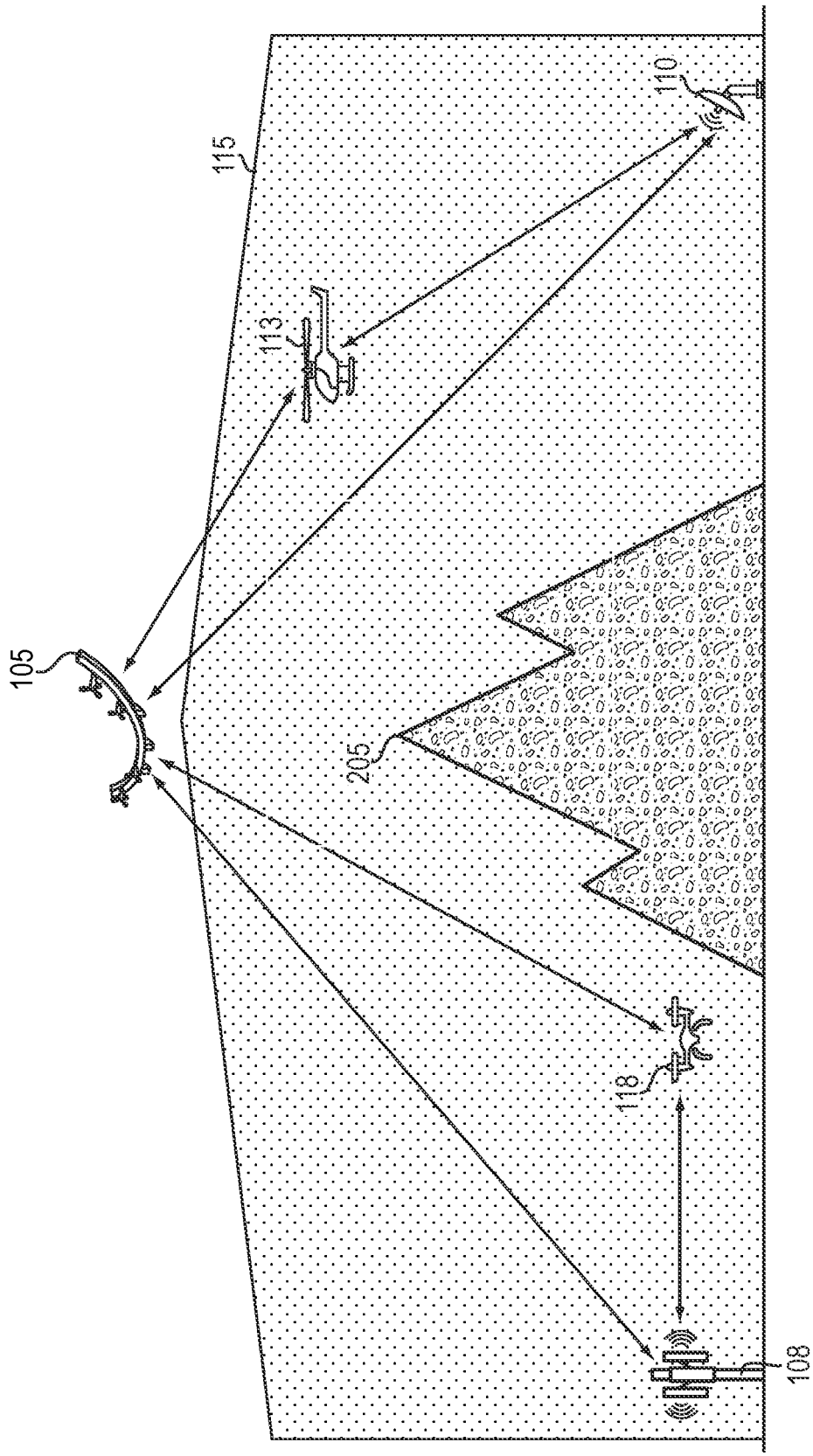
FIG. 2 conceptually illustrates the role of a HAPSNN in predicting the need for and providing communication links in a monitored airspace with obstacles or terrain blocking line-of-sight communications.

As seen in FIG. 2, as the HAPS 105 monitors the position, state, and velocity of the drone 118 and manned air traffic 113 that operate in the monitored airspace 115. The onboard HAPSNN recognizes that, given the operating altitude of the drone 118, terrain or other obstacles 205 will block line-of-sight communications between the drone 118 and the aviation control system 110 and even the aircraft 113. The obstacles 205 may be recognized and mapped in real time by the HAPS 105, but more likely they will be stored in a map accessible locally to the HAPS 105 or via a wireless link. More specifically, the HAPSNN may compute a likelihood of the obstacles 205 interfering with current or future communications between the drone 118 and the aviation control system 110; and if the likelihood exceeds a threshold, registering the need to establish a communication link bridging the drone 118 and the aviation control system 110. In that event, the HAPS 105 responsively obtains the state (position, including altitude, and trajectory) of the drone 118 by any suitable modality or combination thereof, e.g., observation, telemetry, signal monitoring and/or direct communication with the drone 118 and/or terrestrial air traffic control systems that monitor its flight.

As a result of this recognized need, HAPS 105 may enter the communication network as an intermediate node or relay messages (i.e., act as a transmission link) between the drone 118 and the aviation control system 110 (e.g., UTM and LAANC) or other ground-based air-traffic surveillance infrastructure. In the absence of the HAPSNN, the HAPS 105 would have operated reactively—e.g., if the drone 118 had previously been communicating with the HAPS 105 and the control system 110, the HAPS 105 could serve as a backup communication channel when direct communication between the drone 118 and the control system 110 is lost as the drone approaches the obstacle 205. The HAPSNN facilitates proactive, predictive intercession by the HAPS 105 even if no prior communication between the drone 118 and control system 110 has taken place. Based on stored or acquired knowledge of the terrain and the locations of fixed communication features within the airspace 115, as well as the computed trajectory of the drone 118 (which may have only just entered the airspace 115), the HAPSNN recognizes the need for communication between the drone 118 and the control system 110 and causes the HAPS 105 to establish a wireless link with itself as the hub. Similarly, based on knowledge of the terrain and the monitored altitudes of the drone 118 and the manned aircraft 113, the HAPSNN may cause the HAPS 105 to establish a wireless link between the drone 118 and the aircraft 113 with itself as the hub.

Figure 3:
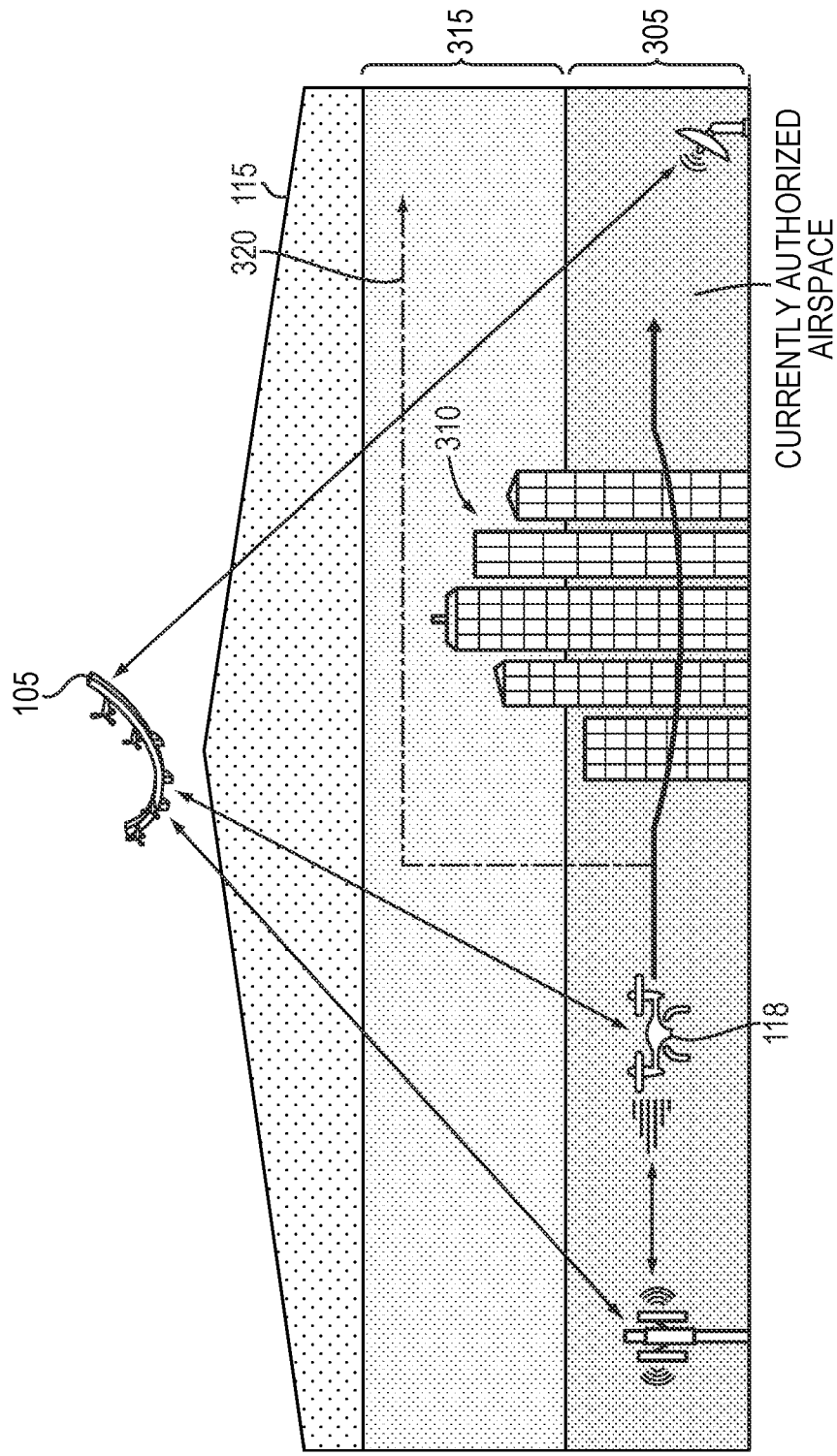
FIG. 3 conceptually illustrates the role of a HAPSNN in predicting the need for and proactively obtaining an expansion of authorized airspace for a drone transiting through a monitored region.

FIG. 3 illustrates a situation in which a drone 118, transiting through an altitude-limited authorized airspace 305, will encounter obstructions collectively indicated at 310 that it must fly around in order to remain within the airspace 305. This deviation from a preprogrammed flight path may be considerable, depending on the extent of the obstructions, and may require course corrections that the drone is not equipped to handle with great accuracy—potentially leading it to miss all or part of the target when it arrives there. With the HAPS 105 in communication with the drone 118, the HAPSNN predicts the need for additional airspace authorization and requests its extension to the region 315. Once the authorization is obtained, the HAPS 105 communicates the relaxation of the altitude restriction to the drone 118. In some embodiments, the HAPS 105 may compute a revised flight path 320 at higher altitude for the drone 118, enabling it to remain on course for the target without any lateral deviation that could affect navigation accuracy.

Figure 4:
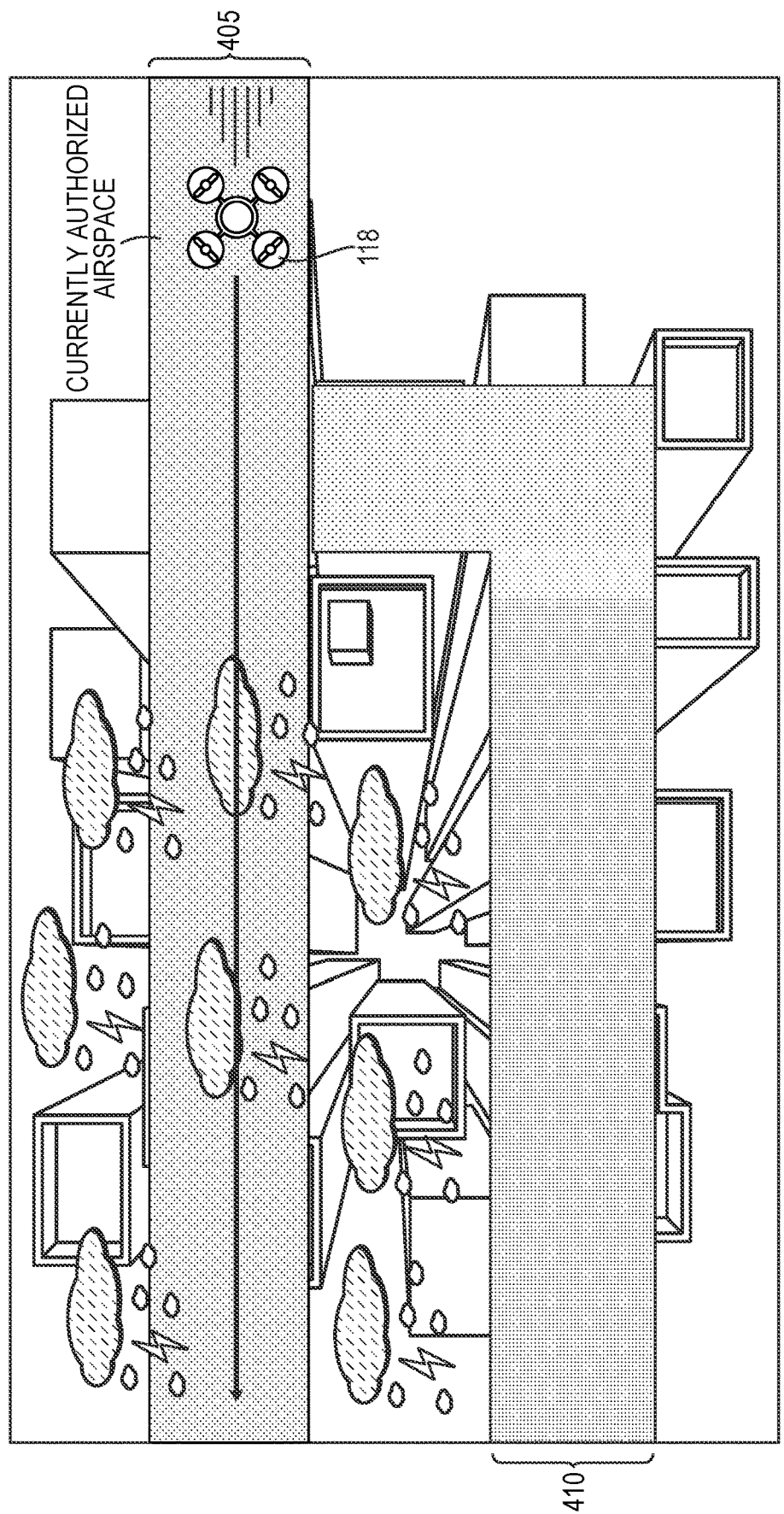
FIG. 4 conceptually illustrates HAPSNN prediction of the need for a flight-plan deviation and authorization therefor.

Similarly, in FIG. 4, the planned and authorized flight path 405 for the drone 118 would take it through a dangerous localized weather pattern, which the HAPS 105 detects with onboard radar or from real-time weather updates. The HAPSNN, aware of the drone's flight path and the weather condition, recognizes the need for an alternative flight segment 410, which it or another onboard computational module computes. The HAPS 105 obtains authorization for the new flight path 410 and communicates it to the navigation system of the drone 118.

Figure 5:
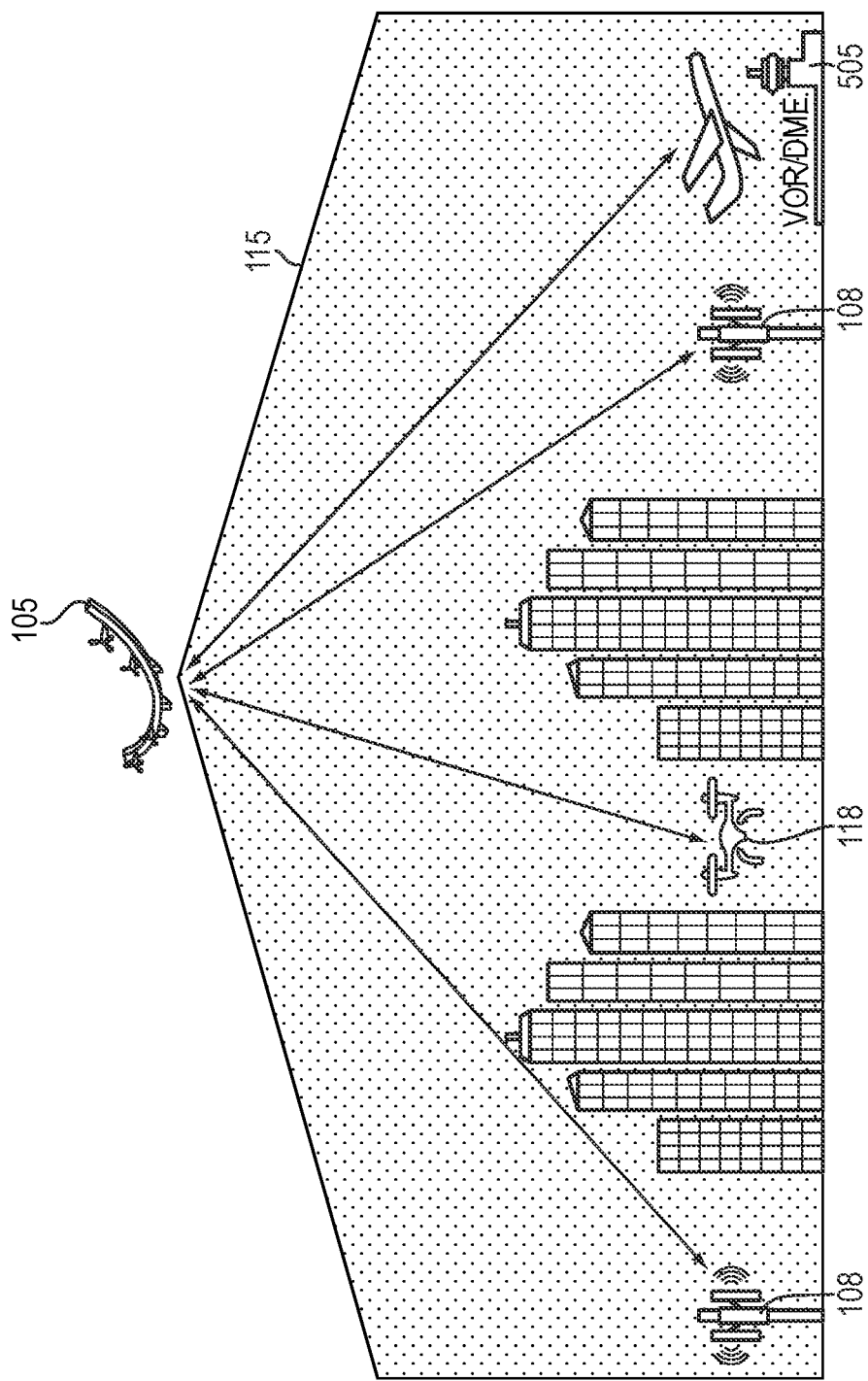
FIG. 5 conceptually illustrates a HAPSNN providing surveillance and connectivity in an airspace to relay signals from multiple navigational aids to air traffic that is out of range or blocked from receiving their signals.

FIG. 5 shows a drone 118 traveling through obstructions that prevent line-of-sight communication with cell towers 108 and a source 505 of National Airspace System navigational aid signals (such as VOR, VOR/DME, TACAN, etc.). The HAPSNN infers this condition from knowledge of terrestrial features within the airspace 115 and the state of the drone 118. As a consequence, the HAPSNN causes the HAPS 105 at least to relay the signals from the blocked sources 108, 505 or to establish a wireless link among the communicating entities 108, 118, 505 with itself as the hub.

Figure 6:
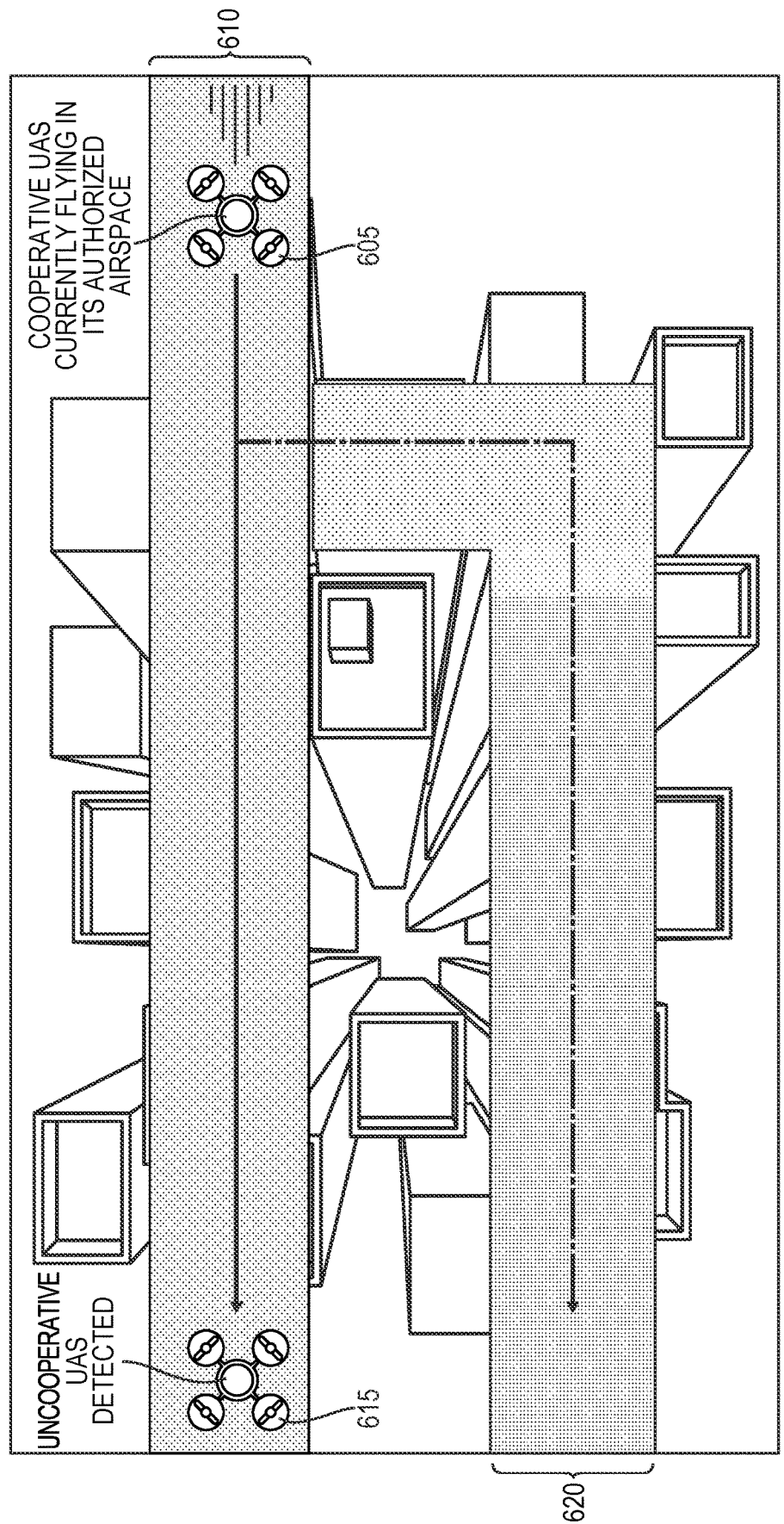
FIG. 6 conceptually illustrates a HAPSNN providing surveillance and connectivity in an airspace to monitor and avoid airspace conflict.

In FIG. 6, a drone 605 is flying in its authorized airspace 610. A second drone 615 enters the airspace 610, and the HAPSNN detects that the drones 605, 615 are not communicating or cannot communicate; for example, one or both of the drones 605, 615 may be "uncooperative," i.e., not equipped to communicate with other drones and de-conflict flight paths. The HAPSNN may infer this based on communication, or the absence thereof, between the drones and/or with ground-based air-traffic surveillance and monitoring systems. The HAPSNN determines that, to avoid collision, the drone 605 should follow an alternative flight path 620, which may be temporary until the drone 605 has passed the drone 615. The HAPSNN or another onboard computational module computes the new flight path 620. The HAPS 105 thereupon obtains authorization for the new flight path 620 and communicates it to the navigation system of the drone 605.

Figure 7:
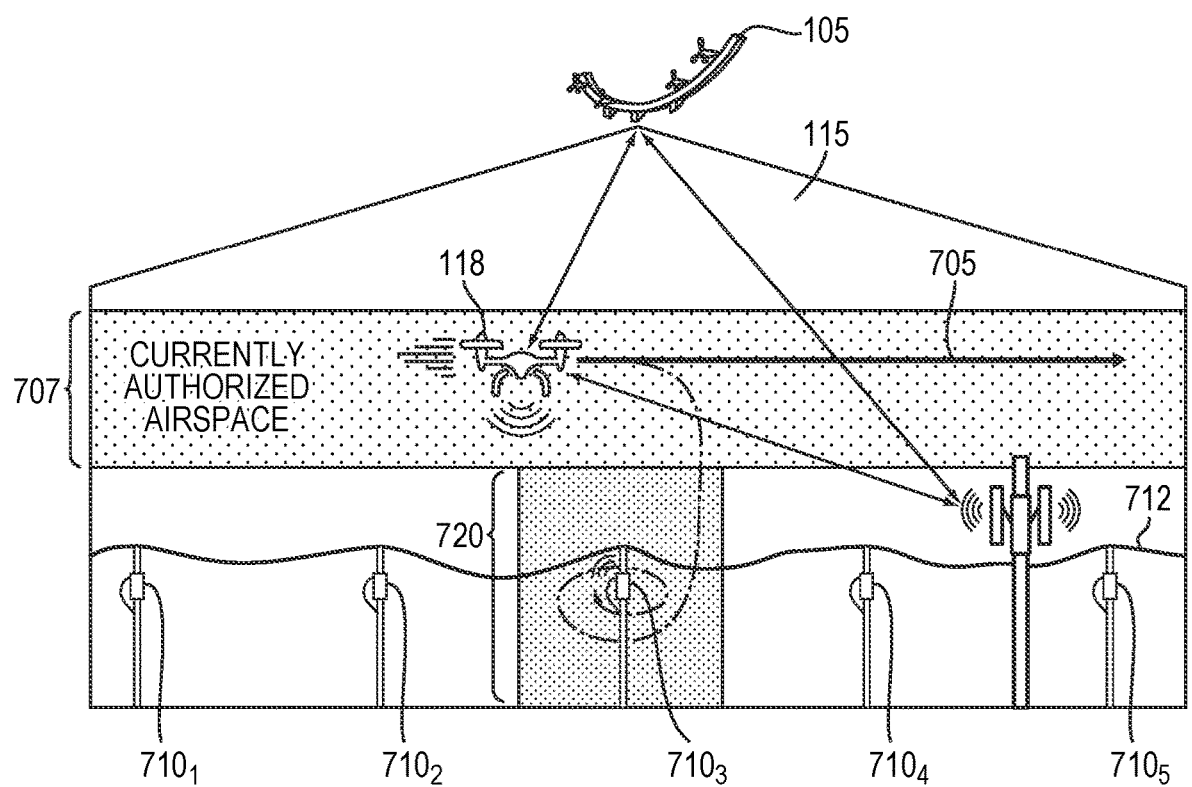
FIG. 7 conceptually illustrates HAPSNN prediction of the need for a flight-plan deviation and authorization therefor in order to enable efficient execution of an inspection mission.

With reference to FIG. 7, a drone 118 may follow a flight path 705 within an authorized airspace corridor 707 to inspect or take data readings from a series of assets (e.g., a sequence of transformers $710_1 \ldots 710_5$ along a power line 712) using, for example, an RFID reader. The HAPSNN monitors the data stream received by the drone 118 and, if the drone detects an anomaly, the HAPSNN may infer that the drone 118 will require a change to its airspace authorization; in particular, if the anomaly is associated with the transformer $710_3$, the predicted authorization need may encompass the region 720. The HAPSNN may cause the HAPS 105 to take action, e.g., relaying the information to appropriate UTM/LAANC systems or requesting a change to airspace authorization on behalf of the drone 118, which will then be free to inspect the transformer $710_3$ more closely and record images of it for real-time or later evaluation.

Figure 8A:
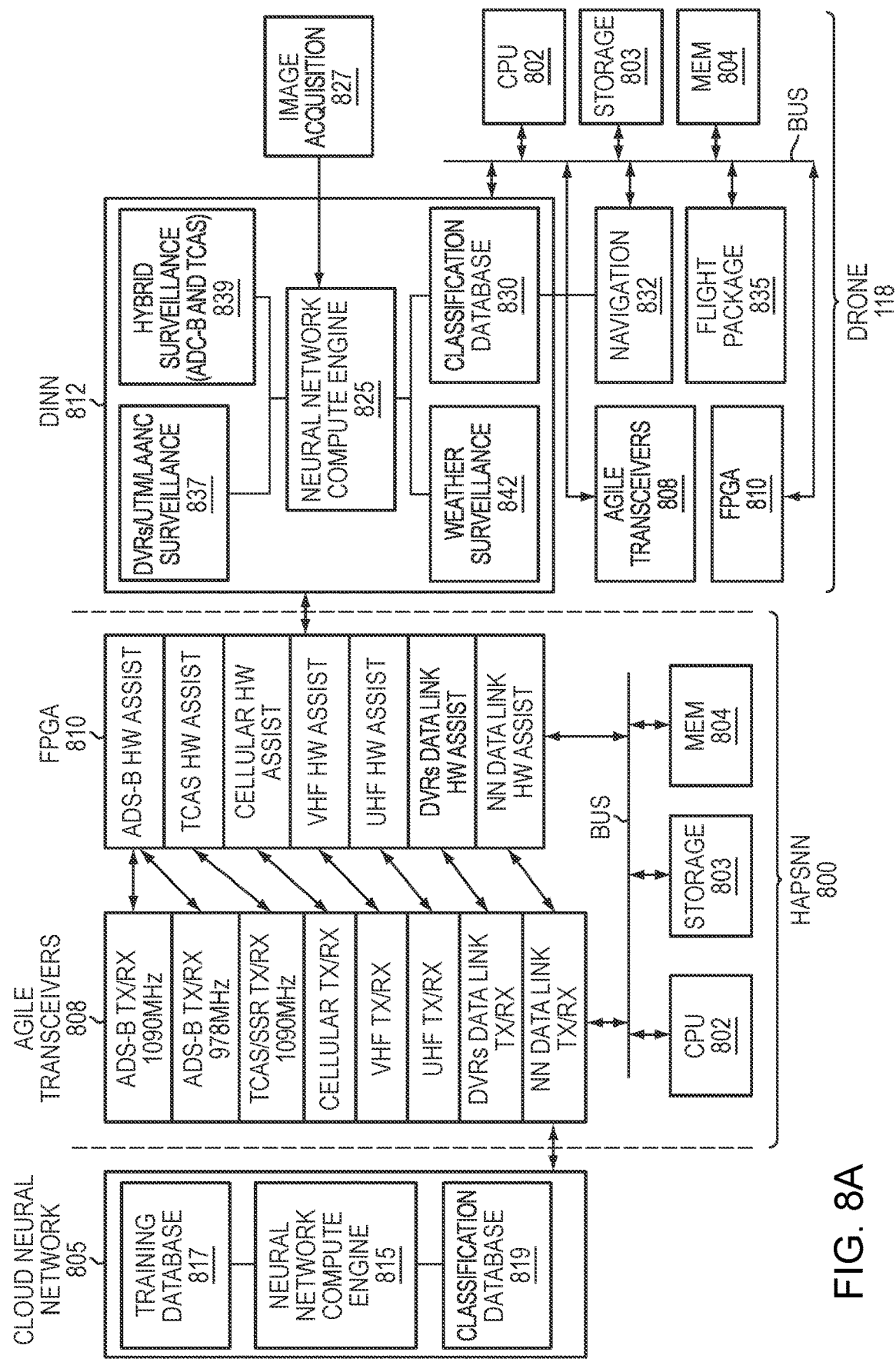
FIG. 8A is a block diagram of representative HAPSNN and DINN architectures in accordance with embodiments of the present invention.

FIG. 8A illustrates a representative HAPSNN architecture 800, which includes the HAPS flight vehicle and various hardware and software elements. In general, a plurality of software subsystems, implemented as instructions stored in a computer memory, are executed by a conventional central processing unit (CPU) 802. The CPU 802 may control the flight and operation of the HAPS vehicle as well as the functions described below, or these functions may be allocated among separate processors 802. In addition, for efficient execution of neural-network functionality, the system may include a dedicated graphics processing unit. An operating system (such as, e.g., MICROSOFT WINDOWS, UNIX, LINUX, iOS, or ANDROID) provides low-level system functions, such as file management, resource allocation, and routing of messages from and to hardware devices (including at least one nonvolatile storage element 803) and the software subsystems, which execute within a computer memory 804. More generally, the HAPSNN 800 may include modules implemented in hardware, software, or a combination of both. For functions provided in software, programs may be written in any of a number of high level languages such as PYTHON, FORTRAN, PASCAL, JAVA, C, C++, C#, BASIC, various scripting languages, and/or HTML. The software modules responsible for operation of the HAPS vehicle, as well as the mechanical and flight features, are conventional and not illustrated; see, e.g., U.S. Pat. No. 10,618,654, the entire contents of which are hereby incorporated by reference.

The HAPSNN 800 includes a neural network module 805, a transceiver module 808, and a field-programmable gate array (FPGA) 810. The modules transceiver module 810 and the FPGA 810 may constitute, or be part of, a communication facility configured to support airborne communication among flight vehicles and with terrestrial and satellite-based control infrastructure. The HAPSNN 800 may (but need not) operate in conjunction with drones that are equipped with a DINN 812. The cloud neural network module 805 may be local to the HAPS vehicle but more typically operates in the cloud, i.e., on a remote (e.g., terrestrial) server in wireless communication with the HAPS vehicle as described below. The modules 808, 810 are typically located on the HAPS vehicle itself.

The cloud neural network module 805 includes a classification neural network 815 that processes images and data received, via agile transceivers 808, from a drone in real time, and which may be passed to the cloud neural network 805. The classification neural network 815 has been trained using a database 817 of training images relevant to the missions that monitored drones will undertake. The classification neural network 815 processes and classifies received images and data and detects—i.e., computes the probability of—anomalies associated therewith. That is, an anomaly may be detected based on something unexpected in a received image or when considered alongside other drone telemetry; for example, an otherwise unexceptional image may trigger an anomaly detection when taken in conjunction with weather conditions reported by the drone. When an anomaly is detected, the classification neural network 815 may consult a classification database 819 to determine the proper response; that is, the database 819 includes records each specifying an anomaly and one or more associated actions that may be taken in sequence. If anomalies are detected that do not have a database record, the images may be transmitted for human inspection and classification. New classifications are then added to the training database 817 and used to retrain the neural network 815. The resulting adjusted weights may be propagated, by the cloud server associated with the neural network 805, back to the DINN 812 (if there is one) transmitting drone and other drones in the field with similar mission profiles. This procedure is described further below.

The agile transceiver package 808 includes Automatic Dependent Surveillance Broadcast (ADS-B), Traffic Collision Avoidance System (TCAS), Secondary Surveillance Radar (SSR), and Automatic Dependent Surveillance Rebroadcast (ADS-R) subsystems that operate at 978 MHz, 1090 MHz, and 1030 MHz for interrogations, responses, and rebroadcasts. These enable the HAPSNN 800 to "listen" to the positions of manned air traffic so the neural network 815 can computationally represent nearby traffic in 3D or 2D space and resolve any conflicts between drones and manned air traffic. This can be achieved by broadcasting the position of a drone to manned air traffic or the positions of manned air traffic to the drone. Emergency alerts may be issued to manned and/or unmanned traffic with instructions on which way to move to deconflict the airspace.

The agile transceivers 808 may include a cellular network package including 3G, 4G, LTE, 5G or any future telecommunication protocol and bandwidth to support communication links between drones operating in the airspace of the HAPSNN 800, with the terrestrial telecommunications network that some UTM systems utilize, or with backhaul communications channels to transmit data from the HAPS to the cloud-based neural network. VHF and UHF transceiver (TX/RX) modules may be used to monitor navigational aids such as VORs, VOR/DMEs or TACANs that enable the neural network 805 to resolve the position of drones as well as of the HAPS using signal time of flight in the event GPS signal is lost. This also enables leveraging satellite communication constellations to transmit or receive data should the need arise. The drone virtual radar (DVR) data link facilitates communication with drone platforms that implement this technology (described, for example, in U.S. Pat. No. 10,586,462, the entire disclosure of which is hereby incorporated by reference) to send and receive air-traffic position information to help resolve conflicts or track drones. The neural network (NN) data link is a dedicated high-bandwidth backhaul channel that enables the HAPSNN 800 to communicate with DINN neural network compute engines 825, transmitting real-time data received from a plurality of drones operating in the monitored airspace and receiving predictions and action instructions obtained from the classification database 819. The FPGA 810 is employed as hardware accelerators to run software that tunes the transceivers 808 and filters out noise.

A representative DINN 812, implemented in a drone 118, includes a neural network compute engine 825, a classification database 830, and "back-end" code to perform various data-handling and processing functions as described below. In addition, the drone 118 includes a communication facility comprising or consisting of a set of agile transceivers 808 and an FPGA 810, as detailed above. Also, the drone 118 may include a CPU 802, storage 803, a computer memory 804.

As noted, although the DINN 812 may interact with a HAPSNN 800, either can exist and operate on its own; that is, a HAPSNN is unnecessary for successful deployment and use of a DINN, while a HAPSNN may perform its surveillance and safety roles for flight vehicles lacking DINNs. The role of the DINN 812 is to enable the drone 118 to classify objects of interest on an asset it is inspecting (e.g., recognizing a cell tower to be inspected and a cracked antenna on such a tower), as well as obstacles that it will need to avoid during flight. The neural network 825 is configured to process and classify images received from an image-acquisition device 827, e.g., a videocamera on the drone 118. Hence, the neural network 825 may be a convolutional neural network (CNN) programmed to detect and recognize objects in the incoming images. These may be classified based on the neural network's training and the DINN 812 (e.g., the back-end code) may consult a classification database 830 to determine the proper response to a detected image. In this case, the database 819 includes records each specifying an object associated with some semantic meaning or action. For example, if the neural network 825 detects a tree in an incoming image, the corresponding database entry may identify a tree as an obstacle and trigger an avoidance maneuver that the drone's navigation system 832 executes by controlling the drone's steering and propulsion system. These are part of the drone's flight package 835, which is conventional and therefore not shown in detail, but includes a power source, communications platform, the propulsion and steering systems, an autopilot system, etc.

The DINN 812 may also receive data from one or more surveillance systems 837, 839, which may include one or more of DVR, UTM, LAANC, ADS-B and TCAS systems. Although these may be implemented as part of the drone's communication platform, they are illustrated as conceptually within the DINN 812 since the neural network 825 may use this data in classifying an image. Similarly, while a weather surveillance system 842 would conventionally be implemented within the drone's communication platform, it is shown as part of the DINN 812 because, once again, weather conditions may be relevant to image classification or database lookup; as shown in FIG. 4, the same visual scene may prompt different actions depending on the weather, e.g., the drone 118 may give buildings a wider berth under windy conditions.

In embodiments where the drone 118 interacts cooperatively with a HAPSNN 800, the latter may provide further support and more powerful classification capabilities; for example, images with detected objects unclassifiable by the neural network 825 may be uploaded to the HAPSNN 800 for examination, and real-time instructions issued in return by the HAPSNN may be executed by the drone's navigation system 832. Moreover, the HAPSNN 800 may update or supply different weight files for the neural network 825 in real time to better fit the drone's mission based on the classifications that are being made by that drone (and which are communicated to the HAPSNN 800 in real time). The neural network 825 responsively loads these new weight files when received.

Figure 8B:
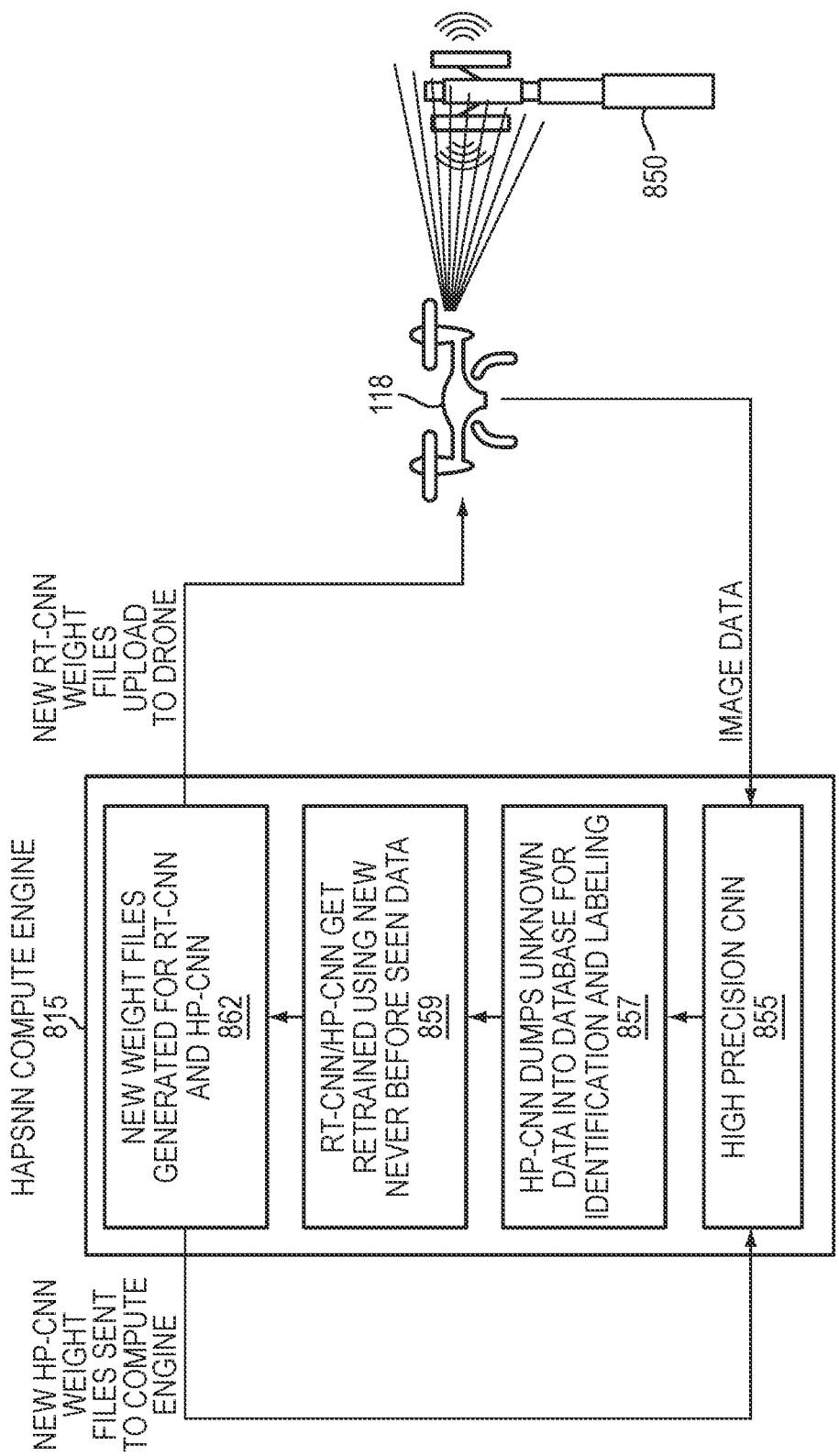
FIG. 8B schematically illustrates the manner in which a HAPSNN may support the operation of a DINN.

This process is illustrated in FIG. 8B. With reference also to FIG. 8A, the DINN 812 processes incoming image frames in real time (e.g., ~30 frames per second (FPS)) to enable the drone 118 to react fast enough to avoid collisions and to fly around the tower 850. Accordingly, the drone 118 may include a graphics-processing unit (GPU) to support CNN operations. Real-time frame analysis allows the GPU to process the images and classify items on interest on an asset being inspected, notify the back-end code of the classification, and enable the back-end code to execute logic to react to the classification—generally by performing a look-up in the classification database 830 to obtain action corresponding to the classification.

The drone 118 transmits image data to the HAPSNN, which includes a high-precision CNN (in the compute engine 815 or even within the HAPS itself, if desired) capable of processing, for example, a 60 Megapixel (MP) photographic image each second. The CNN architecture is designed for speed and accuracy of classification by leveraging back-end logic that runs on the compute engine 825. This back-end logic can change the CNN weight and configuration files based on the asset that is being classified based on the first few images of the asset captured by the drone. These preliminary images are collected as part of a "preliminary" flight path around the asset at a safe distance, and may be 60 MP or greater in resolution. These preliminary images are downscaled to the CNN's input image size (e.g., 224×224, or larger depending on the asset to be inspected), and pass through a sequence (of, e.g., 20) convolutional layers, followed by an average pooling layer, and a fully connected layer pre-trained to classify different assets (e.g., 100 types of assets). Once the type of asset is identified, the weights and configuration files may be changed and more (e.g., four) convolutional layers are added followed by two fully connected layers to output probabilities and bounding boxes of objects or areas of interest that may be present on the asset. The images uploaded from the drone may be increased in size (e.g., to 448×448) as this type of classification requires more granular detail to be present. The degree of size increase may be dynamically controlled, e.g., scaled up if sufficient detail is not detected for reliable classification.

The fully connected layers predict the class probabilities and bounding boxes (i.e. cracked antenna, rust and corrosion, etc.). As an example, the final layer may use linear activation whereas the convolutional layers may use leaky ReLu activation.

Once the back-end logic of the compute engine 825 detects the presence of class and bounding box coordinates, it may switch to and trigger a centroid tracker function to bring that specific classification into the center of the field of view of the drone's image-acquisition device. The back-end logic cooperates with a ranging compute engine to resolve the safest flight path for the drone to approach and position the image-acquisition device for high-resolution scans.

Accordingly, the preliminary flight path establishes the type of asset in view and registers the position of the asset in 3D space relative to the drone to account for any GPS drift vectors. If there are any obstacles or hazards present in the operating area they are classified and their position in 3D space is registered. The centroid tracker is activated once a classification in area of interest is detected and keeps the object of interest centered in the field of view. The ranging compute engine controls forward and backwards movement of the drone. Before any of these commands are executed, the position of the drone in 3D space relative to the asset and any obstacles present in the operating area is obtained. This data runs through back-end logic that resolves a safe GPS waypoint flight path that will bring the drone to the area of interest—in GPS-denied areas, this flight path can still be resolved and executed using Kalman filtering of inertial data in conjunction with centroid and ranging functionality. The flight path is fine-tuned in real time via the centroid tracker and ranging compute engine. It should be noted that the centroid tracker can be run by a HAPSNN 800 rather than the DINN 812.

In step 855, the HAPSNN CNN ("HP-CNN") processes each image to detect objects therein using a standard object-detection routine (e.g., YOLO), and attempts to identify (i.e., classify) all detected objects based on its prior training (discussed further below). Detected objects that cannot be identified are stored in a database and made available to personnel for identification and labeling (step 857). The HP-CNN is then retrained on an augmented dataset including the newly identified and labeled object data (step 859), resulting in generation of new CNN weights (step 862). If the real-time neural network 825 resident on the drone 118 is also a CNN ("RT-CNN"), the HAPSNN 800 may push these weights to the RT-CNN, which receives and loads them. That is, the HP-CNN and RT-CNN may be identical or substantially similar so that CNN weights generated for the HP-CNN may be propagated across a fleet of drones.

The HP-CNN (or, in some embodiments, an RT-CNN on its own) may be trained in a conventional fashion. In particular, the CNN is trained on labeled images of objects likely to be encountered by a drone as it executes its missions, yielding a CNN capable of analyzing and classifying the objects most likely to be encountered by drones in their typical flight paths. Because no training set can be exhaustive and drones will inevitably encounter unknown objects during use, the above-described process of spotting unrecognized objects, storing them for manual labeling, and thereafter retraining the CNN on the augmented dataset helps minimize the risk of mishap by constantly enriching the drones' visual vocabularies and action repertoires. Although this is most efficiently accomplished using a HAPSNN as a central training hub that receives unclassifiable objects from many drones and can keep all of their neural networks updated to reflect the latest classification capabilities, it is nonetheless possible to implement this training and retraining function on individual DINNs.

Figure 9A:
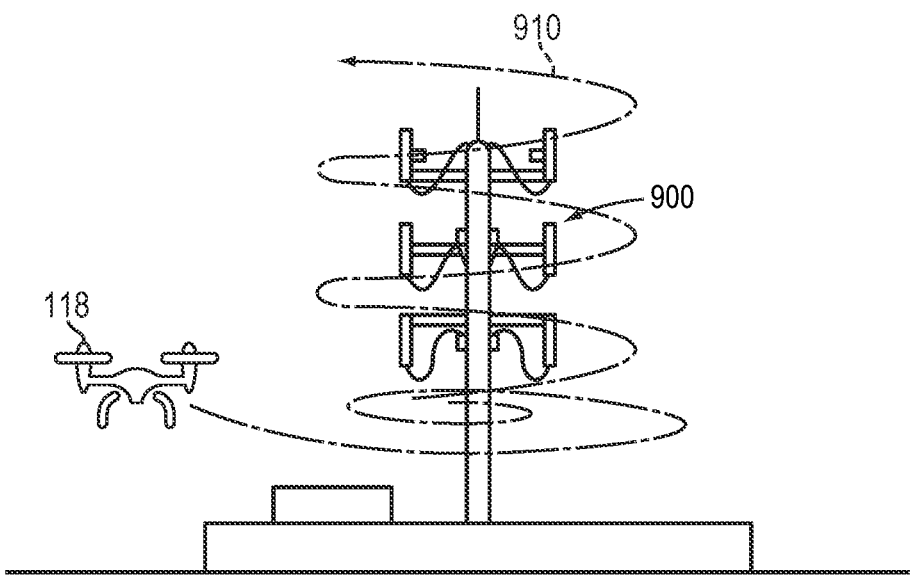
FIGS. 9A and 9B schematically illustrate generation of flight plans that execute an inspection mission, and which may change in real time as the drone performs the inspection.
Figure 9B:
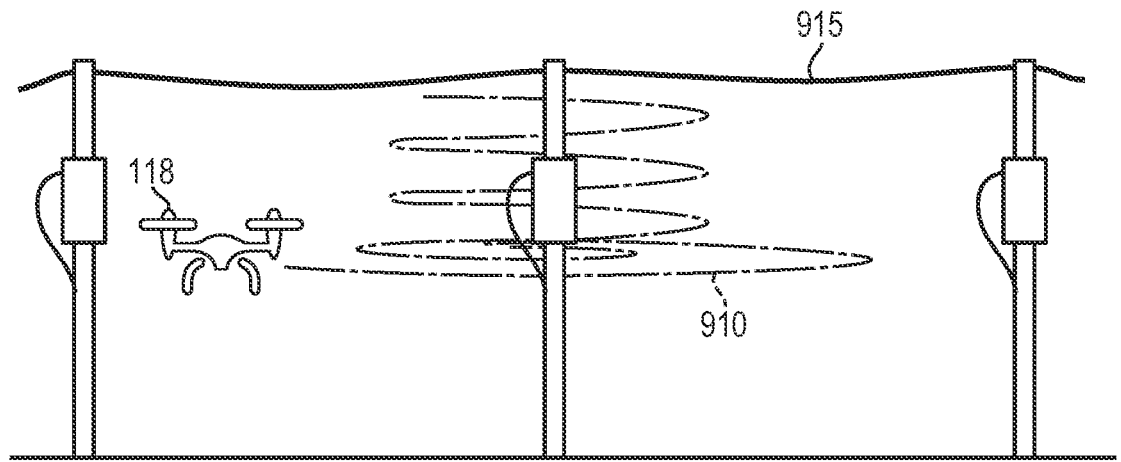

FIGS. 9A-13E illustrate various drone applications and the manner in which a DINN may be used to control and simplify drone operation. In FIG. 9A, the DINN 812 guides the drone 118 around an antenna 900 to be inspected in accordance with a flight pattern 910 that may change in real time as the drone 118 detects anomalies or structures requiring closer inspection. For example, as shown in FIG. 9B, the flight path 910 may be altered to keep the drone 118 clear of power lines 915, which will have been recognized as an obstacle.

Figure 10:
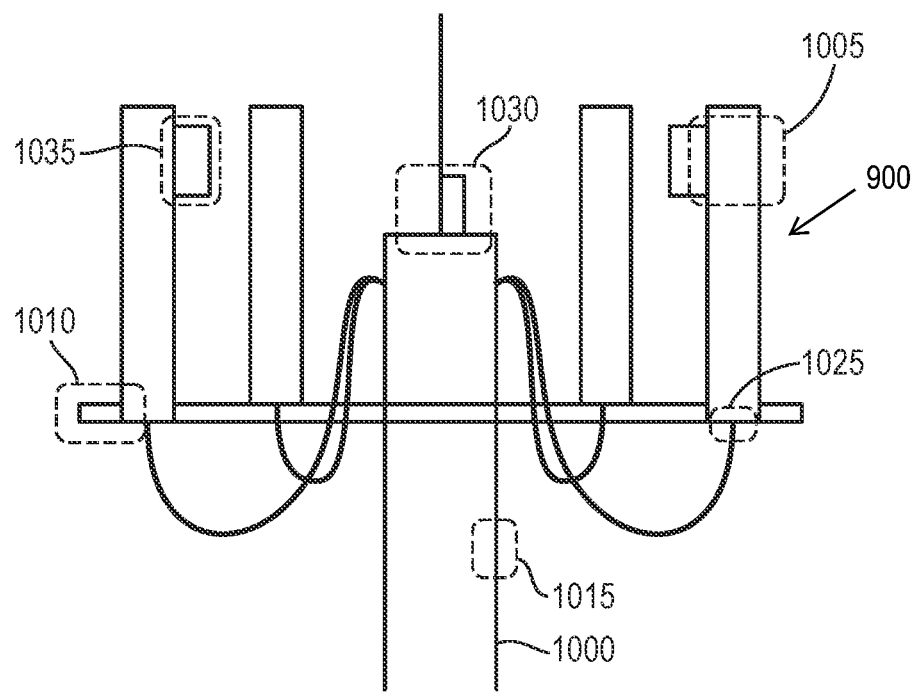
FIG. 10 is an elevation illustrating various anomalies associated with an antenna that a drone in accordance herewith may identify.

With reference to FIG. 10, an antenna 900 may have a crack 1005, which is identified by a DINN-equipped drone. The back end may execute an openCV function to fix a centroid on the antenna 900 and move the drone to center the antenna in the field of view to facilitate image acquisition. This can be coupled with a depth map generated by stereo RGB cameras of known sensor size, lens properties, and camera focal point separation to position the drone 118 close enough to the antenna for the camera to resolve sufficient detail to pick up the cracks well. Other faults that may be recognized by the drone 118 include structural corrosion 1010 and a paint coating anomaly 1015. The drone 118 payload may include additional sensors, such as an EM sensor and an infrared camera, and the DINN 812 may include additional modules such as a spectral analysis and/or electromagnetic compute engine. These enable the drone 118 to detect a PIM signature at a coax connector 1025 and other EM anomalies such as magnetic fields emanating from a lightning arrestor 1030 (indicating the possibility of arcing), as well as an abnormal heat signature 1035. These conditions may be diagnosed as well as observed by the drone 118 or using onboard compute engines and/or in cooperation with a HAPSNN 800 as described above. The DINN 812 may further include a ranging compute engine to run data fusion between a depth map obtained as discussed above and laser rangefinder/radar/ultrasonic or any other ranging sensors that the drone payload may contain to derive the most accurate range readings; a computer vision compute engine to perform image-processing and analysis functions (such as centroid placement, as noted above); and/or an infrared and multispectral compute engine to analyze infrared and other images obtained at wavelengths outside the visible spectrum.

Figure 11:
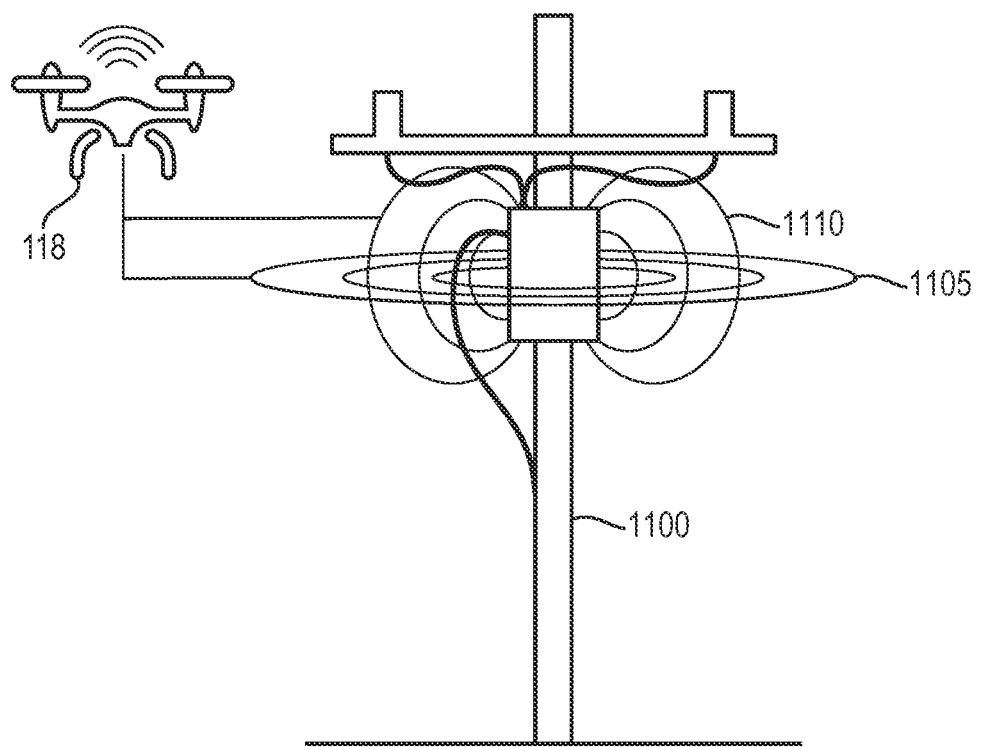
FIG. 11 conceptually illustrates detection by a drone of an abnormal electromagnetic (EM) signature from a transformer.
Figure 12:
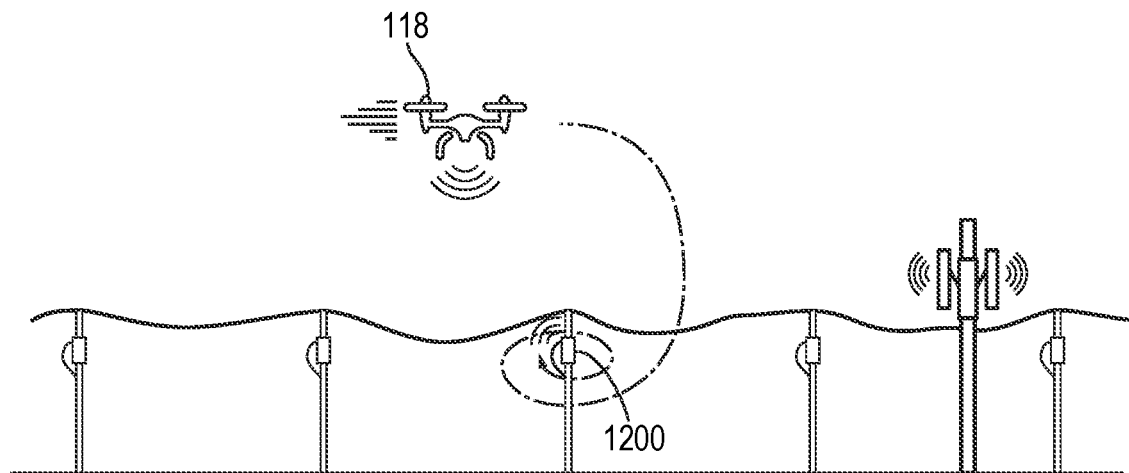
FIG. 12 conceptually illustrates an in-flight drone reading stored data indicating an abnormality.

As shown in FIG. 11, if the drone 118 detects an unusual EM signature from an asset 1100—such as abnormal non-vertical magnetic field lines 1105, whereas under normal operation the field lines are vertical as indicated at 1110—it may record the anomaly or, in embodiments where the drone 118 is in communication with a HAPSNN, report it to the HAPSNN, which may autonomously summon a drone with a more specialized inspection payload to better diagnose the condition. The drone 118 may also communicate or otherwise interact with an asset to be inspected. In FIG. 12, a drone 118 reads data stored in a transformer 1200 indicating an abnormality. That is, the transformer 1200 has self-diagnostic capability and, when an operating anomaly was earlier detected, data indicative of the detection was stored internally. If the transformer 1200 is inspected regularly by a drone 118 and the anomalous condition does not require urgent attention, it may not be necessary for the transformer to communicate its presence to supervisory personnel upon detection. Rather, when the drone 118 makes an inspection flight, it can interrogate the memories of all transformers and thereby acquire previously stored data indicating transformer anomaly detections. This may prompt the drone 118 to perform a closer inspection (as indicated in the figure) in response to the classification of the condition and database lookup. Once again, a HAPSNN may recognize the condition and send new weights to the DINN of the drone 118, enabling it to make condition-specific classifications as it inspects the transformer 1200.

Figure 13A:
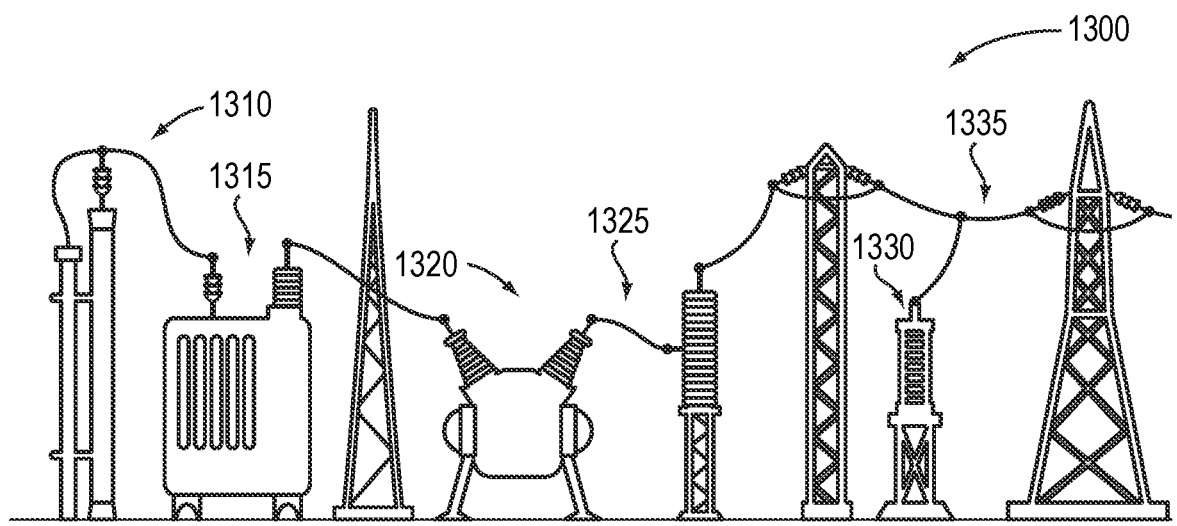
FIGS. 13A-13E schematically illustrate a process for establishing an optimal flight path through a complex inspection environment.
Figure 13B:
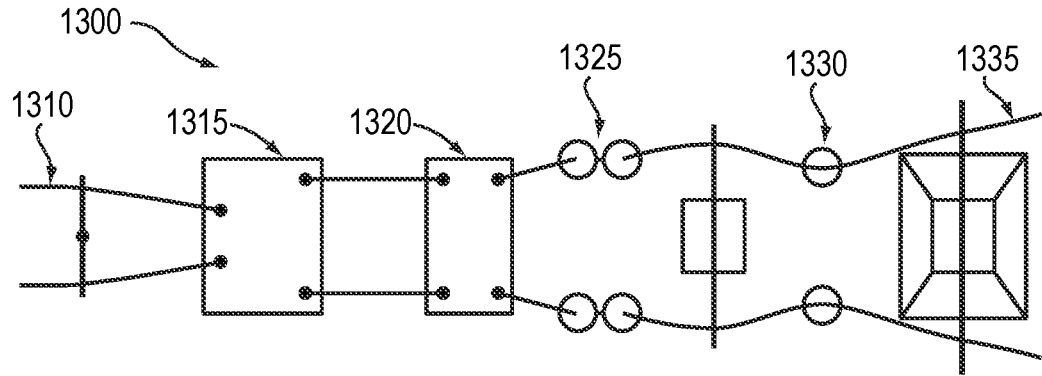
Figure 13C:
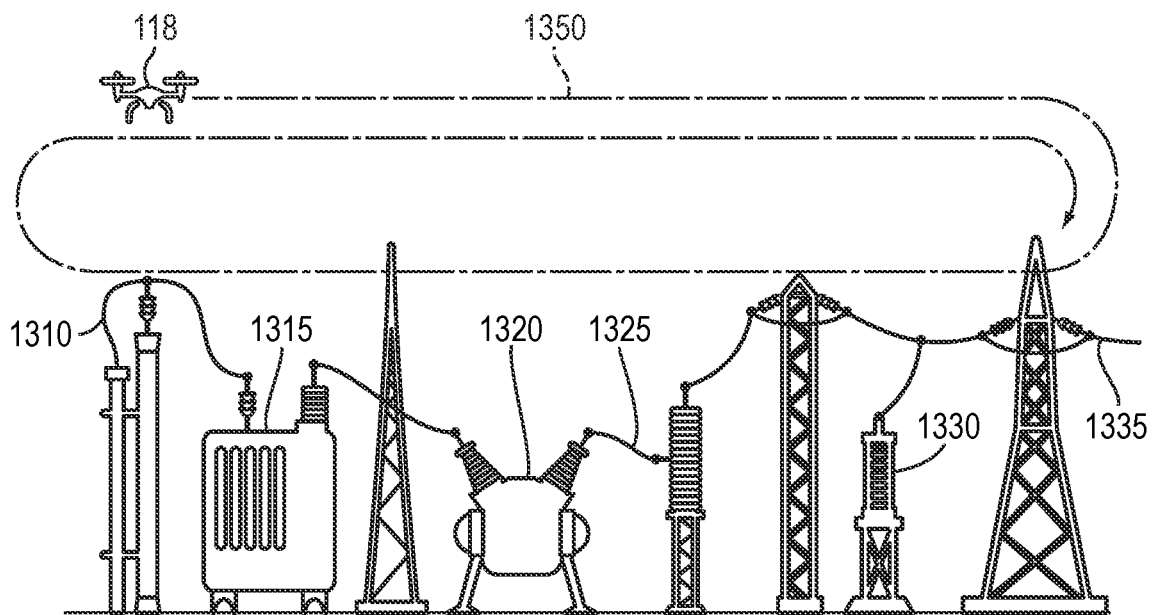
Figure 13D:
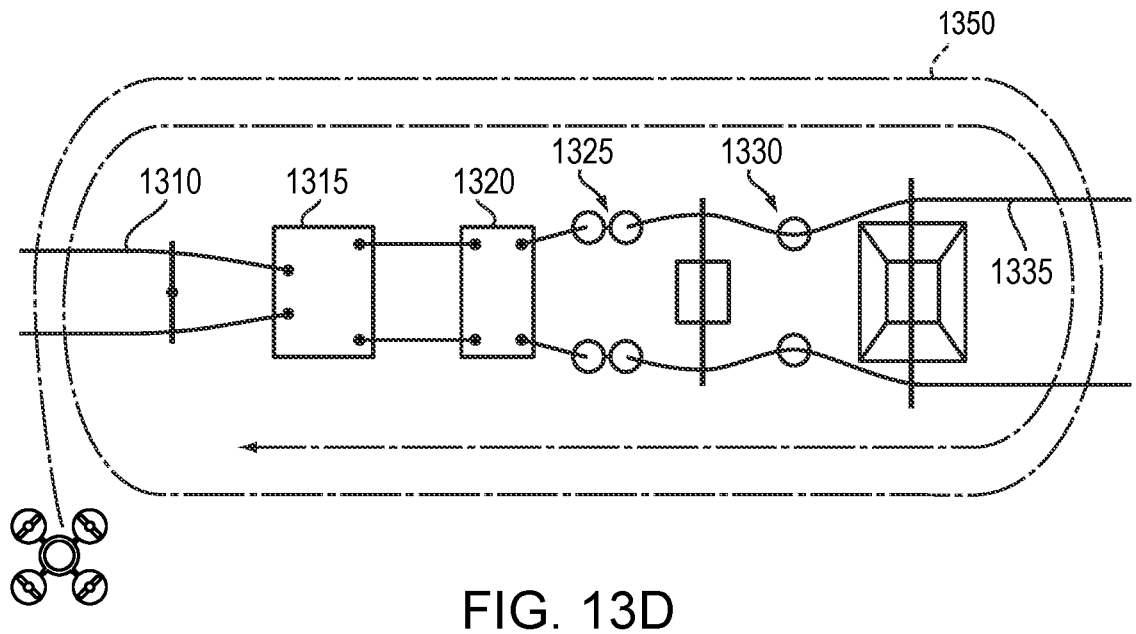
Figure 13E:
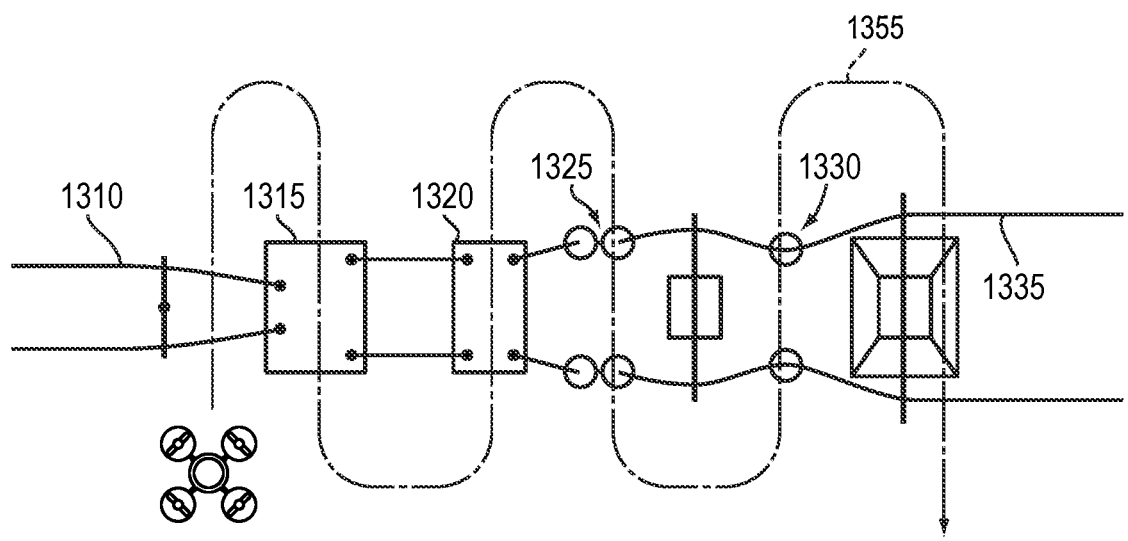

FIGS. 13A-13E show how a DINN 812 can establish an optimal flight path through a complex inspection environment. FIGS. 13A and 13B illustrate a power distribution substation 1300 including a series of outgoing transmission lines collectively indicated at 1310, a voltage regulator 1315, a stepdown transformer 1320, a series of switches 1325, one or more lightning arrestors 1330, and incoming transmission lines collectively indicated at 1335. Any of these components can develop anomalies or malfunction, and all may be inspected by a drone 118. As shown in FIGS. 13C and 13D, the drone 118 may execute a preliminary flight pattern 1350 to gather images for analysis by the DINN, alone or in concert with a HAPSNN. The DINN 812 analyzes images acquired by the drone's onboard camera and classifies the various components 1310-1335. Based on these classifications, the navigation module 832 (see FIG. 8) or back-end code computes an optimized flight plan 1355 that permits all of the components 1310-1335 to be properly and efficiently inspected by the drone 118. In greater detail, each component present in the substation 1300 is classified during the preliminary inspection flight path 1350, which is farther away from the substation 1300 to accommodate GPS drift vectors and other unknowns relating to obstacles or inaccuracies about the initial flight path. Once a component is classified, its position in the image, as well as that of the drone, is registered. This process repeats multiple times throughout the preliminary inspection and enables the back-end code to triangulate and position each of the classified assets in a 3D space so a more precise inspection flight path, which will bring the drone and payload closer to the assets, can be calculated. This new flight plan 1355 is then executed and again the DINN 812 classifies assets as the flight path is executed. In the preliminary inspection, the drone is farther away so the DINN 812 can only classify large items as the resolution of the image-acquisition device(s) is fixed. Once the closer flight path 1355 is executed, more asset detail will be detected, enabling the DINN 812 to classify new items and adjust the path of the drone again as needed. The ranging compute engine calculates the closest allowable approach distance between drone and an asset consistent with an acceptable safety margin.

Figure 14:
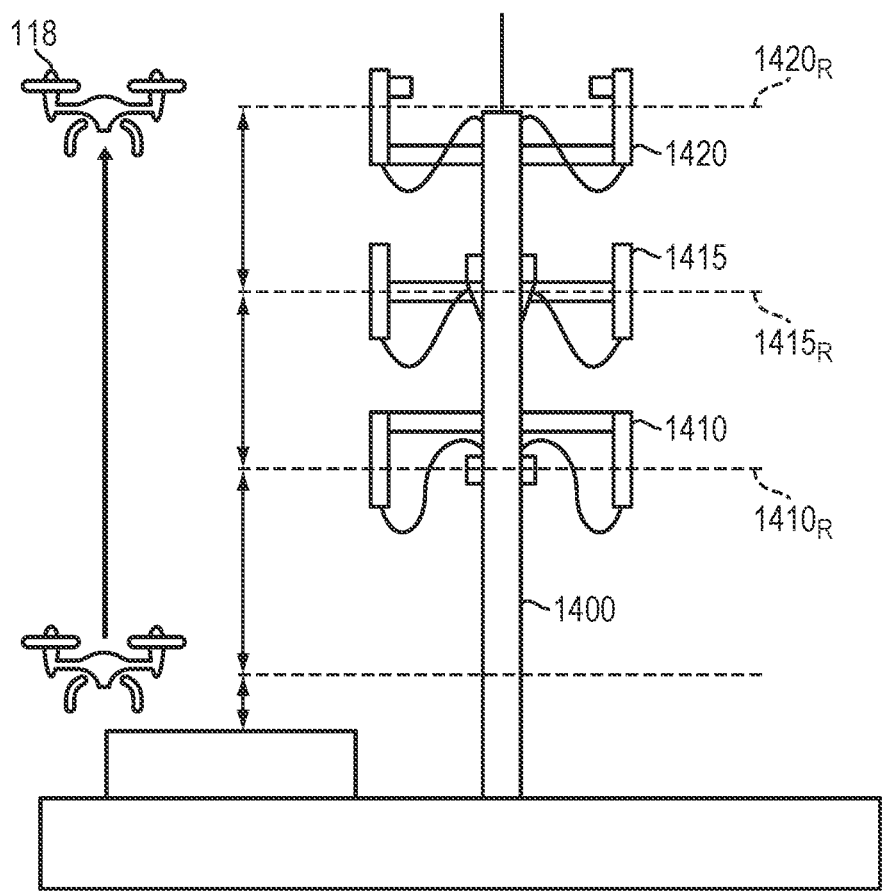
FIG. 14 schematically illustrates detection and classification of the centers of radiation of a plurality of antennas.

Still another application in which a complex inspection operation may be optimized by a DINN is illustrated in FIG. 14. Here the objective is to detect and classify the "rad center"—i.e., the center of radiation $1410_R$, $1415_R$, $1420_R$ of each of the antennas 1410, 1415, 1420, which are mounted to the telecommunication structure 1400 at different elevations. A DINN can classify a rad center and then identify, for each antenna, a centroid to bring the rad center into the center of the field of view of the drone camera so that a barometer reading (elevation) can be recorded. The navigation module 832 can then use this elevation to generate an orbit flight path that enables the drone 118 to obtain 3D model data for reconstruction of the antenna structure.

The DINN 812 may be configured to detect cyber-attacks, determine one or more actions needed to mitigate or defeat the attack, and cause the action(s) to be effected. In some instances, this may involve the HAPSNN 800. For example, the DINN 812 may detect that the navigation package 832 has been compromised by the attack, and may transfer control of navigation to the HAPSNN 800, which monitors, in real time, the location of the drone 118 and images recorded by the image-acquisition device 827 to navigate the drone 118 around obstacles and, e.g., return it to its starting location or that of the operator. In other cases, the DINN 812 may recognize the existence of a cyber-attack but not its characteristics, in which case it will be unable to identify an action to be taken in response. In this situation, it may communicate to the HAPSNN 800 the data that revealed the existence of the attack; the HAPSNN 800, alone or after communication with terrestrial resources, may deduce the nature of the attack and a mitigation strategy, which is communicated to the drone 118; once again, the mitigation strategy may involve assumption of control by the HAPSNN 800 of the operation of the drone 118.

In the event of GPS spoofing attacks designed to hijack a drone and guide it away from its intended flight path, or RF saturation attacks designed to sever the connection between a drone and a HAPSNN or terrestrial communications, the DINN 812 can track the position of the drone relative to an asset or other landmarks and enable the drone 118 to resist being navigated in other directions, or maintain a safe flight path until communications are reliably re-established. In the event of laser attacks intended to disorient or blind optical sensors, the DINN 812 can recognize and classify the patterns produced by such attacks and trigger responses by the drone to counter the attack or alter the flight path of the drone to avoid the source of the attack.

Figure 15A:
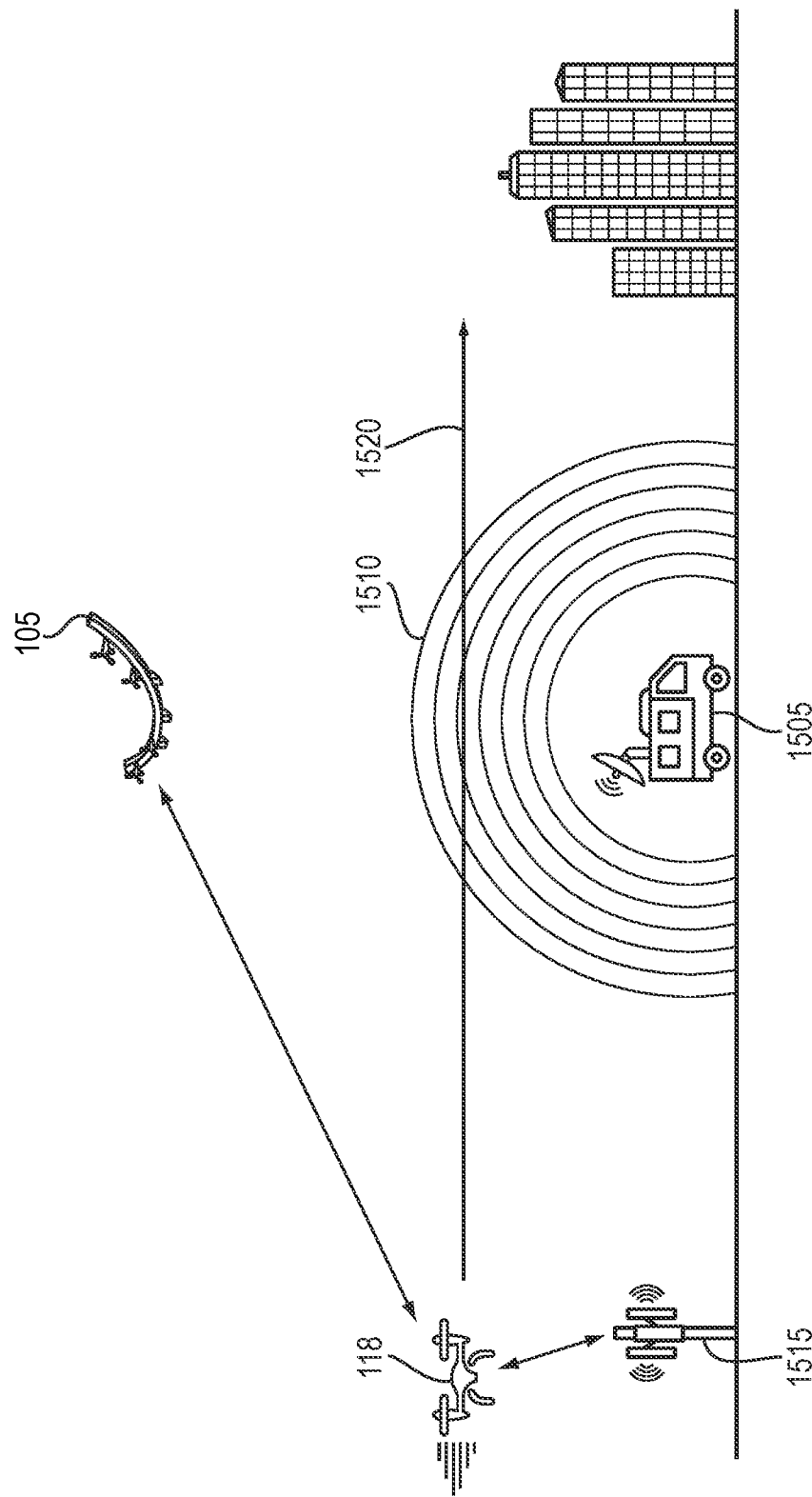
FIGS. 15A-15C schematically illustrate a response to an RF blocking attack in accordance with various embodiments.
Figure 15B:
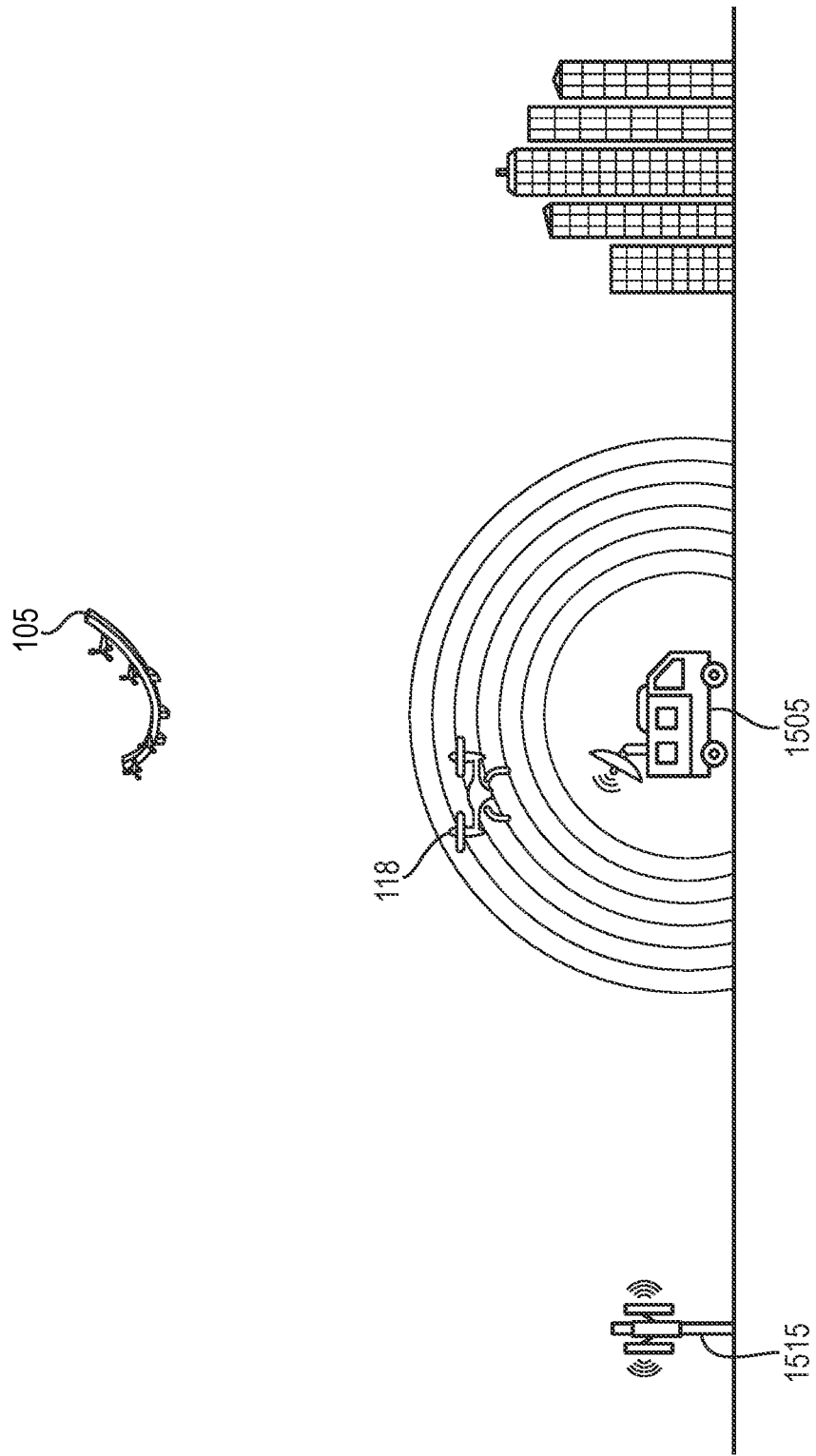
Figure 15C:
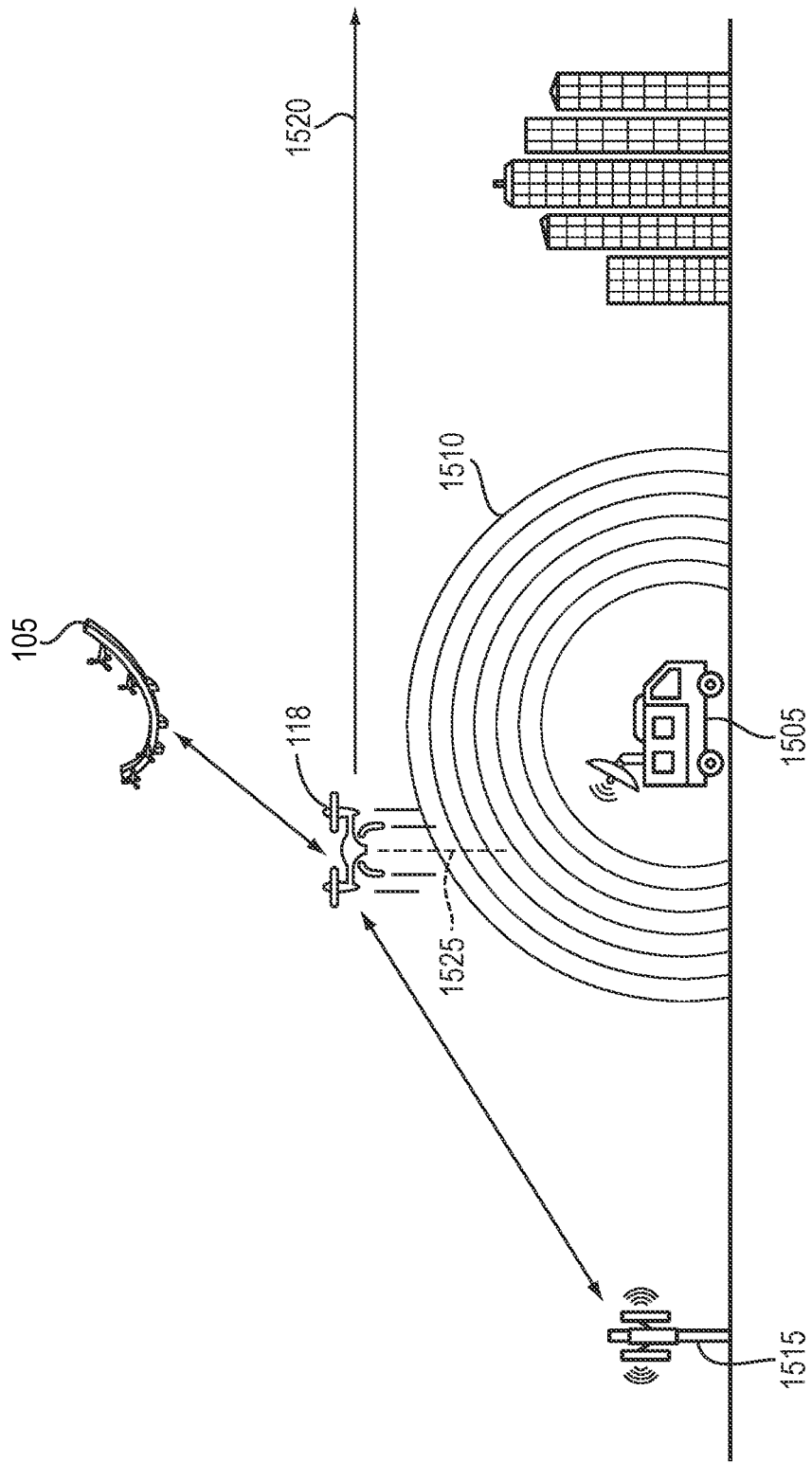

In its simplest form, a GPS spoofing attack consists of RF signals that wash out the RF signals from the actual GPS constellations. The spoof attacker replaces actual position information with whatever information is needed to confuse the GPS to think it is moving away from its intended location (basically guiding the GPS to make corrections to move back to where it needs to be in the direction of where the GPS spoofer wants the GPS to move). The flight path of the drone 118 to an asset is usually preplanned using GPS waypoints that the drone executes while the DINN 812 uses optical flow sensors to correct and adjust the flight path in real time as it classifies assets and any obstacles or hazards in the operating environment. For example, FIG. 15A shows a drone 118 on a flight path to a destination of interest possibly, though not necessarily, while being guided by a HAPS 105. The position of the drone 118 is monitored by the HAPS 105 and the drone itself based on, e.g., GPS and/or a terrestrial cellular network 1515 and/or navigation aids. A vehicle-borne RF source 1505 generates an RF field 1510 that overwhelms RF communications within a spherical effective region around the source 1505. The drone's flight path 1420 passes through the RF field 1510, and when the drone 118 enters the RF field 1510 as shown in FIG. 15B, communications with the HAPS 105 and terrestrial cellular network 1515 are cut off. Recognizing the nature of the attack, the DINN 812 of the drone 118 causes execution of a preprogrammed evasive flight path 1525 until communications are no longer affected by the RF field 1510, and communications are re-established. The DINN 812, alone or more typically with assistance from the HAPS 105, computes a new flight plan 1530 (based on the destination and, in some cases, the estimated shape of the RF field 1510) that keeps the drone 118 of out range of the interfering RF field 1510.

In particular, the DINN 812 can plot a new flight path for the drone 118 via back-end logic and conventional algorithms that generate a 3D map of the operating environment and plots the position of the drone 118, assets, and/or obstacles in this environment. This data is stored in memory associated with the neural compute engine 825 and may be optimized to enable real-time computation and resolution of positions. This makes tracking the actual position of the drone relative to where the drone needs to be and relative to landmarks or obstacles straightforward. Kalman filtering can be applied to track the movements of the drone 118 using the inertial navigation capabilities of the system 832, which is data fused with neural network classifications that may utilize image matching of prestored waypoints to track drone movement, compass data, optical flow tracking of assets or landmarks using RGB sensors, national airspace navigational aid position information, and/or GPS position information. This enables the DINN 812 to plot the position of the drone in this 3D environment in real time and detect if one or more of the sensors is giving abnormal readings that put the drone 118 in a different position in the 3D environment relative to where it should be and where other sensors indicate that it is. As an example, if the GPS during a spoofing attack indicates that the drone 119 is moving away from its intended waypoint, but the inertial navigation aids, optical flow sensors that are tracking a landmark, and the national airspace navigational aids indicate that the drone 118 is moving towards the waypoint, the DINN 812 will recognize that a GPS spoofing attack is taking place. Once the scenario is classified, algorithms designed to maneuver the drone to counter the attack or other maneuvers that have been preprogrammed to move the drone away from the attack can be triggered.

The data link between a DINN 812 and the HAPSNN 800 is typically encrypted and may leverage a handshake to make sure that each DINN 812 is identified by the HAPSNN 800 before a communications channel is opened. This also serves to deter unauthorized communication attempts or spoofing by unauthorized users or DINNs.

Figure 16A:
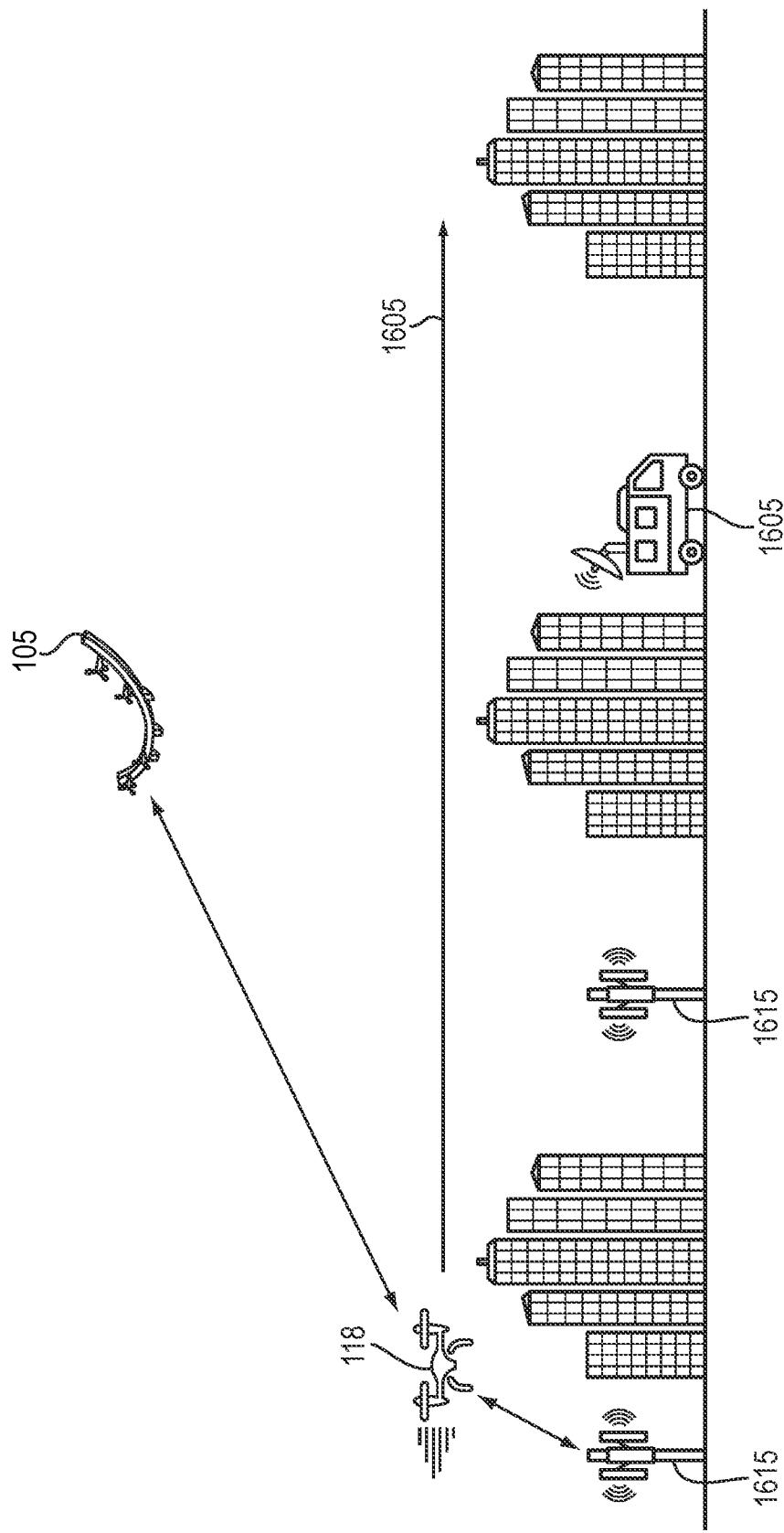
FIGS. 16A-16C schematically illustrate a response to a laser attack in accordance with various embodiments.
Figure 16B:
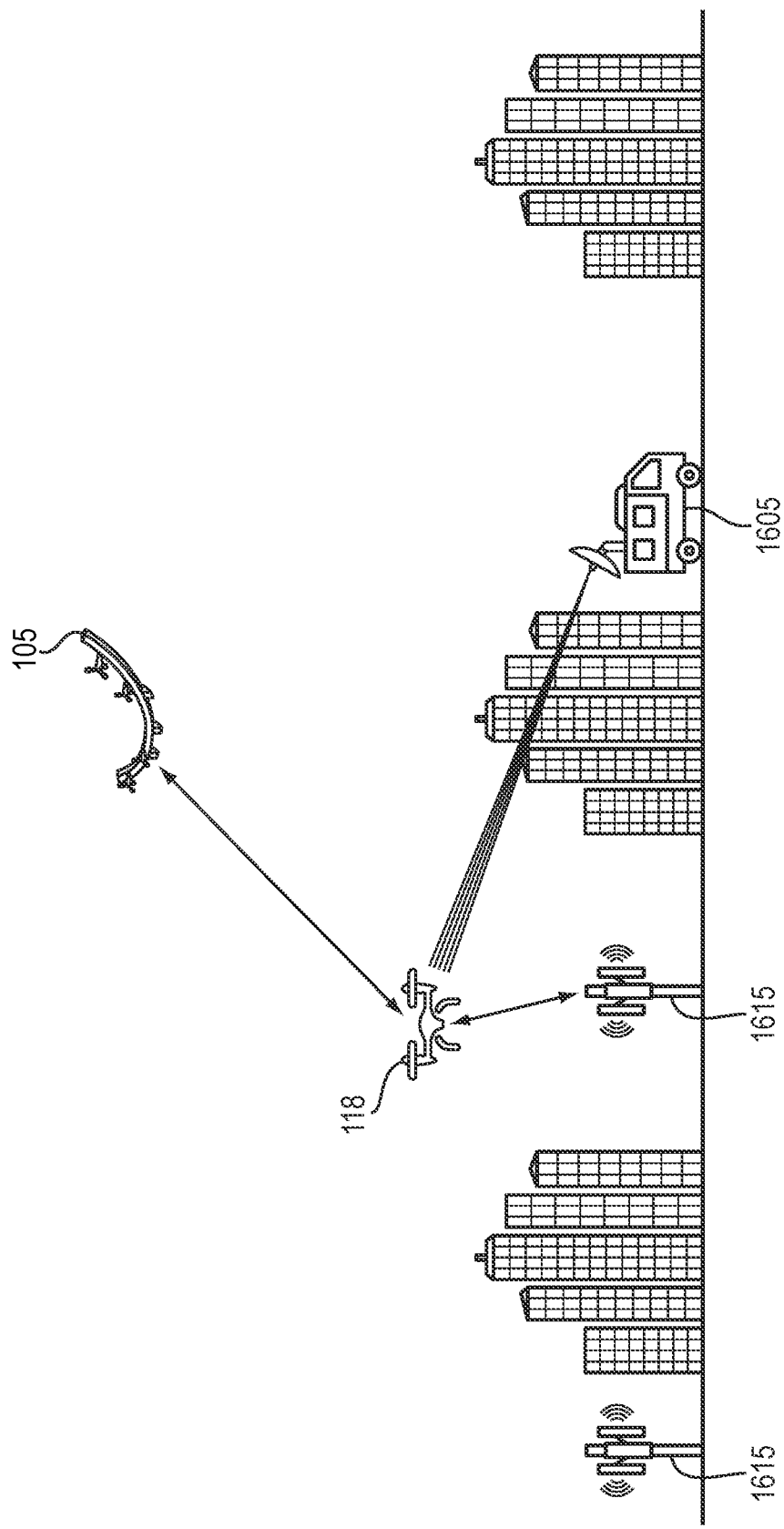
Figure 16C:
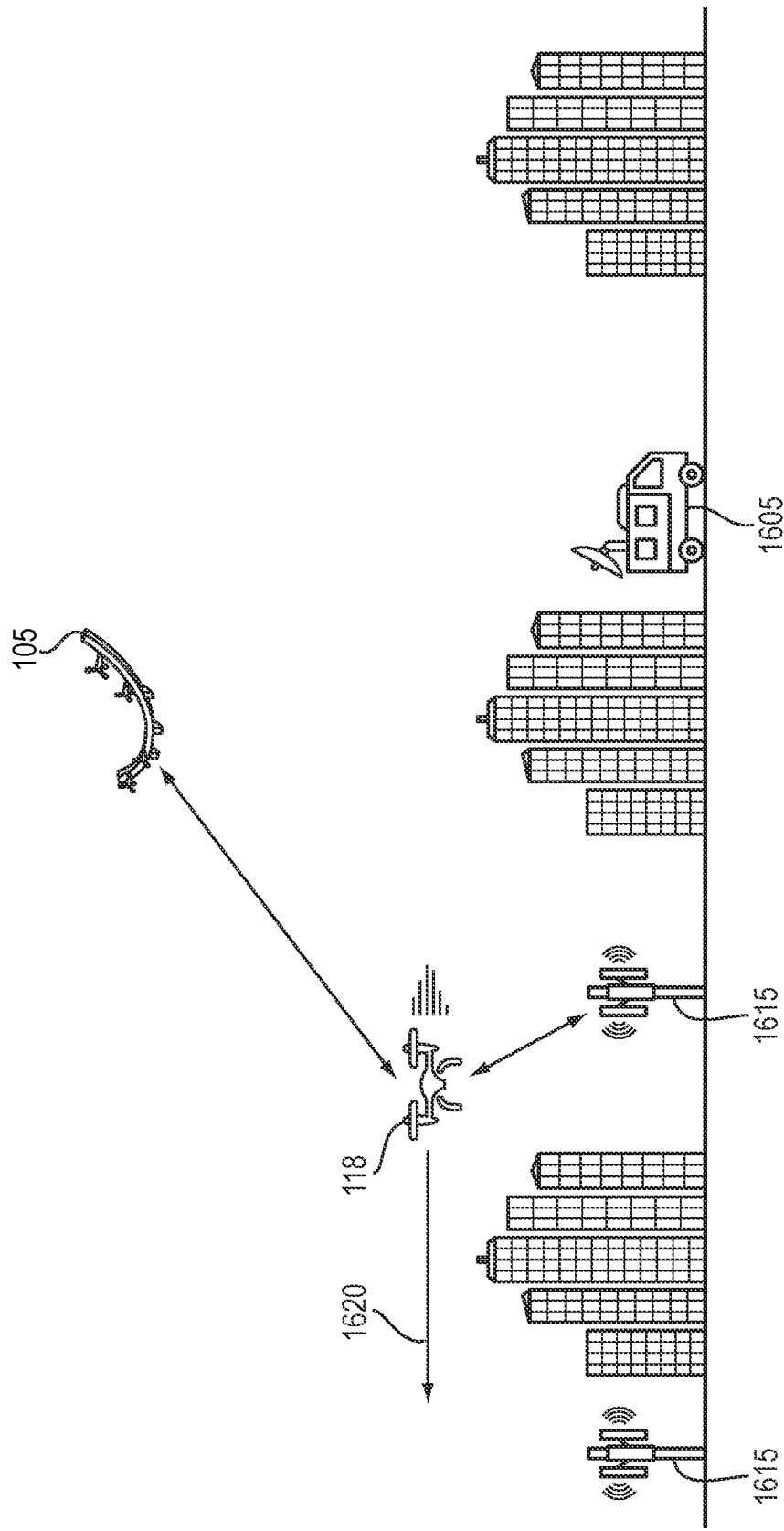

In its simplest form, a laser or optical attack is designed to damage the imaging sensor in optical flow devices such as RGB or IR cameras. If the sensor is not damaged, the shutter speed or aperture openings may be affected, washing out the images so patterns or colors can no longer be distinguished and thereby making the sensors unusable. This in effect stops the optical flow sensor from being used for navigational purposes as a neural network is no longer able to classify patterns in the images. Such scenarios are relatively simple to detect, e.g., if a predefined threshold number of washed-out photos in a given period of time is detected when the sensors are pointing at a specific heading. An algorithm can be activated via back-end logic to change the heading of the optical flow sensor to detect if the washed-out photos cease. If so, and if when the sensors are pointed back to the original heading the washed-out photos resume, the DINN 812 will recognize and classify the scenario as a laser attack, and will plot that area/heading in the 3D environment as a no-fly zone. Given that laser or other optical attacks are directional, this is a simple solution to implement. For example, FIG. 16A shows a drone 118 on a flight path 1605 to a destination of interest possibly, though not necessarily, while being guided by a HAPS 105. The position of the drone 118 is monitored by the HAPS 105 and the drone itself based on, e.g., GPS and/or a terrestrial cellular network 1615 and/or navigation aids. A laser attacker 1605 targets the drone 118 (FIG. 16B), and the DINN 812 detects the pattern of the laser attack, enabling back-end logic to perform evasive actions. As shown in FIG. 16C, the DINN 812 and/or the HAPSNN of the HAPS 105 may generate a new flight path 1620 around or away from the source 1605 of the laser attack.

If GPS signals, navigational aid signals, and data link signals to a HAPSNN or terrestrial communication networks are all lost simultaneously, the DINN 812 will classify the scenario as an RF saturation attack, at which point back-end logic may initiate conventional algorithms that leverage the 3D environment stored in memory associated with the neural compute engine 825 to plot a path out and away from the current operating environment. The actual flight path of the drone 118 relative to the 3D plot is monitored and adjusted using optical flow and inertial navigation Kalman filtering until the drone 118 is able to reestablish RF communications.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An unmanned aerial vehicle (UAV) comprising:
a flight package;
a UAV navigation system;
a UAV image-acquisition device;
a UAV communications array including a plurality of agile transceivers;
a computer memory including a plurality of pre-stored waypoints and flight images of a pre programmed flight path; and
a drone inspection neural network including a neural compute engine and a predictor,
the neural compute engine including a processor and instructions, stored in the computer memory and executable by the processor, for using real time data received from one or more of the UAV image-acquisition device, the UAV communications array or the UAV navigation system as input to reconstruct a real time 3D map of the UAV operating environment and to position the UAV in real time in the 3D map;
the neural network-based predictor computationally trained to:
receive the real time 3D map and the real time UAV data and
identify and classify (a) that an attack on the UAV is occurring, (b) characteristics and type of attack, and (c) if the attack is new and uncharacterized,
where the neural compute engine is configured to:
send attack data to a HAPS or cloud based neural compute engine if the attack is classified as uncharacterized,
request updated predictor weight and configuration files identifying the characteristics and type of attack, and
receive updated weight and configuration files with classifications for the type of attack. and mitigation instructions in real time.

2. The UAV of claim 1, with the neural compute engine configured to identify a mitigation action to be taken in response to the classified attack type, and cause the action to be taken.

3. The UAV of claim 1, where the UAV communication array is configured to communicate with terrestrial and High Altitude Pseudo Satellite (HAPS) based communications networks, to establish a data link with the HAPS or the cloud based neural compute engine.

4. The UAV of claim 1, where the cloud based or HAPS based neural compute engines enable dynamic increase in UAV neural compute power in real time.

5. The UAV of claim 1, further comprising a database of actions, the neural compute engine being configured to select and cause execution of a mitigating action from the database of actions in response to the detected attack that has been classified by the predictor.

6. The UAV of claim 5, wherein the attack is GPS spoofing and the mitigating action is causing the UAV to navigate without GPS.

7. The UAV of claim 6, wherein navigation of the UAV is executed using optical flow or inertial navigation, and a UAV position along a prestored waypoint flight plan is tracked using classification of real time flight images from the UAV that are compared to prestored images of waypoints along the prestored waypoint flight plan, wherein the prestored images of the waypoints are separate and distinct from the real time flight images.

8. The UAV of claim 5, wherein the UAV communications array tunes into a plurality of National Airspace Navigational Aids to track UAV position along a prestored waypoint flight plan.

9. The UAV of claim 5, wherein the attack is GPS spoofing and the action is causing transfer of navigation control to the HAPS vehicle based neural compute engine, wherein the HAPS vehicle based neural compute engine is separate and distinct from the neural compute engine of the UAV.

10. The UAV of claim 5, wherein the attack is RF blocking and the action is execution of a preprogrammed flight plan that does not require external communication, wherein the preprogrammed flight plan is separate and distinct from the pre programmed flight path of the UAV.

11. The UAV of claim 10, wherein the preprogrammed flight plan relies on (i) at least one of inertial navigation or optical flow to navigate the UAV along a preprogrammed waypoint flight plan and (ii) classifying when the UAV reaches each waypoint using image matching utilizing pre-stored waypoint images.

12. The UAV of claim 5, wherein the attack is a laser attack and the action is to plot and cause the UAV to follow a flight path away from a source of the laser.

13. The UAV of claim 5, wherein the neural compute engine is further configured to communicate with a HAPS vehicle in order to computationally identify the mitigation action.

14. A method for a UAV including a flight package, a UAV navigation system, a UAV image-acquisition device, a UAV communications array including a plurality of agile transceivers, a computer memory including a plurality of pre-stored waypoints and flight images of a pre programmed flight path, a drone inspection neural network including a neural compute engine and a predictor, the neural compute engine including a processor and instructions, stored in the computer memory and executable by the processor, and the neural network-based predictor, the method comprising:
using, by the neural compute engine, real time data received from one or more of the UAV image-acquisition device, the UAV communications array or the UAV navigation system as input to reconstruct a real time 3D map of the UAV operating environment and to position the UAV in real time in the 3D map;
receiving, using the neural network-based predictor, the real time 3D map and the real time UAV data;
identifying and classifying, using the neural network-based predictor, (a) that an attack on the UAV is occurring, (b) characteristics and type of attack, and (c) if the attack is new and uncharacterized
sending, using the neural compute engine, attack data to a HAPS or cloud based neural compute engine if the attack is classified as uncharacterized,
requesting, using the neural compute engine, updated predictor weight and configuration files identifying the characteristics and type of attack, and
receiving, using the neural compute engine, updated weight and configuration files with classifications for the type of attack, and mitigation instructions in real time.

15. The method of claim 14, further comprising: identifying, using the neural compute engine, a mitigation action to be taken in response to the classified attack type, and cause the action to be taken.

16. The method of claim 14, where the UAV communication array is configured to communicate with terrestrial and High Altitude Pseudo Satellite (HAPS) based communications networks, to establish a data link with the HAPS or the cloud based neural compute engine.

17. The method of claim 14, wherein the cloud based or HAPS based neural compute engines enable dynamic increase in UAV neural compute power in real time.

18. The method of claim 14, wherein the UAV further includes a database of actions, and the method further comprising:
selecting and causing, using the neural compute engine, execution of a mitigating action from the database of actions in response to the detected attack that has been classified by the predictor.

19. The method of claim 18, wherein the attack is GPS spoofing and the mitigating action is causing the UAV to navigate without GPS.

20. The method of claim 19, wherein navigation of the UAV is executed using optical flow or inertial navigation, and a UAV position along a prestored waypoint flight plan is tracked using classification of real time flight images from the UAV that are compared to prestored images of waypoints along the prestored waypoint flight plan, wherein the prestored images of the waypoints are separate and distinct from the real time flight images.

21. The method of claim 18, wherein the UAV communications array tunes into a plurality of National Airspace Navigational Aids to track UAV position along a prestored waypoint flight plan.

22. The UAV of claim 18, wherein the attack is GPS spoofing and the action is causing transfer of navigation control to the HAPS vehicle based neural compute engine, wherein the HAPS vehicle based neural compute engine is separate and distinct from the neural compute engine of the UAV.

23. The UAV of claim 18, wherein the attack is RF blocking and the action is execution of a preprogrammed flight plan that does not require external communication, wherein the preprogrammed flight plan is separate and distinct from the pre programmed flight path of the UAV.

24. The UAV of claim 23, wherein the preprogrammed flight plan relies on (i) at least one of inertial navigation or optical flow to navigate the UAV along a preprogrammed waypoint flight plan and (ii) classifying when the UAV reaches each waypoint using image matching utilizing pre-stored waypoint images.

25. The UAV of claim 18, wherein the attack is a laser attack and the action is to plot and cause the UAV to follow a flight path away from a source of the laser.

26. The UAV of claim 18, wherein the neural compute engine further configured to communicate with a HAPS vehicle in order to computationally identify the mitigation action.

* * * * *